(12) United States Patent
Berg, Jr.

(10) Patent No.: US 11,845,177 B2
(45) Date of Patent: Dec. 19, 2023

(54) PIPE FITTING STAND

(71) Applicant: MILWAUKEE ELECTRIC TOOL CORPORATION, Brookfield, WI (US)

(72) Inventor: Steven J. Berg, Jr., Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 78 days.

(21) Appl. No.: 17/172,560

(22) Filed: Feb. 10, 2021

(65) Prior Publication Data
US 2021/0245356 A1   Aug. 12, 2021

Related U.S. Application Data

(60) Provisional application No. 63/080,854, filed on Sep. 21, 2020, provisional application No. 62/972,477, filed on Feb. 10, 2020.

(51) Int. Cl.
| A47B 3/00 | (2006.01) |
| B25H 1/04 | (2006.01) |
| F16M 11/38 | (2006.01) |

(52) U.S. Cl.
CPC .............. B25H 1/04 (2013.01); F16M 11/38 (2013.01); *A47B 3/00* (2013.01)

(58) Field of Classification Search
CPC ............. B23Q 3/00; D06F 81/02; A47B 3/00
USPC .... 248/146, 149, 150, 151, 154, 163.1, 165, 248/166, 168, 169, 170, 171, 439, 176.1, 248/177.1; 269/131, 132, 16, 136–138; 108/121, 123, 128
See application file for complete search history.

(56) References Cited

U.S. PATENT DOCUMENTS

| 960,916 A | 6/1910 | Heiser |
| 1,008,277 A | 11/1911 | Lanter |
| 1,040,603 A | 10/1912 | Amborn |
| 1,048,100 A | 12/1912 | Rorig |
| 1,054,661 A | 3/1913 | Amborn |
| 1,158,414 A | 10/1915 | Amborn |

(Continued)

FOREIGN PATENT DOCUMENTS

| CN | 2106684 U | 6/1992 |
| CN | 2810939 Y | 8/2006 |

(Continued)

OTHER PUBLICATIONS

International Search Report and Written Opinion for Application No. PCT/US2021/017391 dated Jun. 4, 2021 (12 pages).

(Continued)

*Primary Examiner* — Alfred J Wujciak
(74) *Attorney, Agent, or Firm* — Michael Best & Friedrich LLP

(57) ABSTRACT

A pipe fitting stand for supporting a pipe during a work operation includes a table, and a plurality of legs coupled to the table and movable between a deployed position and a stowed position. The pipe fitting stand additionally includes a locking mechanism movable between a first position in which the locking mechanism engages at least one of the plurality of legs, and a second position in which the locking mechanism disengages the at least one of the plurality of legs. The locking mechanism is configured to secure the table in the stowed position in the second position.

20 Claims, 21 Drawing Sheets

(56) References Cited

U.S. PATENT DOCUMENTS

| | | | |
|---|---|---|---|
| 1,252,423 A | 1/1918 | Friess | |
| 1,426,531 A | 8/1922 | Albinson | |
| 1,686,023 A | 10/1928 | McCloskey | |
| 1,695,311 A | 12/1928 | Young | |
| 1,726,898 A | 9/1929 | Jones | |
| 1,784,264 A | 12/1930 | Young | |
| 1,785,884 A | 12/1930 | Vosper | |
| 1,798,340 A | 3/1931 | Thewes | |
| 1,807,916 A | 6/1931 | Jones | |
| 1,812,967 A | 7/1931 | Long | |
| 1,897,449 A | 2/1933 | Trowbridge | |
| 2,005,162 A | 6/1935 | Petersen | |
| 2,110,718 A | 3/1938 | Shiley | |
| 2,297,980 A | 10/1942 | Perkins | |
| 2,343,924 A | 3/1944 | Petersen | |
| 2,380,911 A | 7/1945 | Petersen | |
| 2,548,401 A | 4/1951 | Sherwood | |
| 2,573,276 A | 10/1951 | Roberts | |
| 2,619,858 A | 12/1952 | Starbuck et al. | |
| 2,666,609 A | 1/1954 | Ingwer | |
| 2,673,742 A | 3/1954 | Vermette | |
| 2,678,790 A | 5/1954 | Egger | |
| 2,709,384 A | 5/1955 | Harris | |
| 2,767,606 A | 10/1956 | Dyczynski | |
| 2,831,583 A | 4/1958 | Wright et al. | |
| 2,938,414 A | 5/1960 | Blomme | |
| 2,958,245 A | 11/1960 | Neef et al. | |
| 2,978,114 A | 4/1961 | Halligan | |
| 2,989,142 A | 6/1961 | Gill | |
| 2,991,490 A | 7/1961 | Pirone | |
| 3,379,431 A | 4/1968 | Gill | |
| 3,830,340 A | 8/1974 | Schaffel | |
| 4,154,435 A | 5/1979 | Alessio | |
| 4,199,123 A * | 4/1980 | Weber | F16M 11/34 |
| | | | 248/168 |
| 4,209,274 A | 6/1980 | Martin et al. | |
| 4,449,430 A | 5/1984 | Nakamura et al. | |
| 4,579,322 A | 4/1986 | Schwarz | |
| 4,642,002 A | 2/1987 | Wagner | |
| 4,671,478 A | 6/1987 | Schoenig et al. | |
| 5,065,989 A * | 11/1991 | Ho | B25B 1/2442 |
| | | | 403/317 |
| 5,067,535 A | 11/1991 | Wolff | |
| 5,135,208 A | 8/1992 | Diskin | |
| 5,551,655 A | 9/1996 | Berger | |
| 5,681,034 A * | 10/1997 | Noniewicz | B25H 1/10 |
| | | | 269/244 |
| 5,727,778 A | 3/1998 | Nodar | |
| 5,924,660 A | 7/1999 | Marron | |
| 5,924,684 A * | 7/1999 | Cheng | B25H 1/14 |
| | | | 269/220 |
| 6,073,919 A | 6/2000 | Hammit et al. | |
| 6,302,097 B1 | 10/2001 | Rivera | |
| 6,302,410 B1 | 10/2001 | Wentworth et al. | |
| 6,471,220 B1 | 10/2002 | Babb | |
| 6,659,440 B2 | 12/2003 | Levy | |
| 6,725,971 B1 | 4/2004 | Bair | |
| 7,401,850 B2 | 7/2008 | Micheel | |
| 7,430,968 B2 | 10/2008 | Clark | |
| 7,537,186 B2 | 5/2009 | Putre et al. | |
| 7,690,408 B2 | 4/2010 | Sugiura | |
| 7,992,852 B2 | 8/2011 | Marineau et al. | |
| 8,266,776 B2 | 9/2012 | Dwileski, Jr. | |
| 8,276,895 B2 | 10/2012 | Brown et al. | |
| 8,439,164 B1 * | 5/2013 | Esposito | B25H 1/16 |
| | | | 182/182.1 |
| 8,601,855 B1 | 12/2013 | Hamm et al. | |
| 8,727,330 B2 | 5/2014 | Hamm et al. | |
| 8,777,205 B2 | 7/2014 | Hamm et al. | |
| 8,967,606 B2 | 3/2015 | Hamm et al. | |
| 8,985,565 B2 | 3/2015 | Mann | |
| 9,079,271 B2 | 7/2015 | Dwileski, Jr. | |
| 10,105,834 B2 | 10/2018 | Hamm et al. | |
| 11,426,856 B2 * | 8/2022 | Baruch | B25H 1/18 |
| 2002/0011196 A1 | 1/2002 | Floyd et al. | |
| 2006/0156531 A1 | 7/2006 | Dwileski | |
| 2007/0116510 A1 * | 5/2007 | Kelly | F16B 7/06 |
| | | | 403/116 |
| 2008/0029662 A1 | 2/2008 | O'Rourke | |
| 2008/0256770 A1 | 10/2008 | Dwileski | |
| 2008/0263849 A1 | 10/2008 | Dwileski | |
| 2008/0263850 A1 | 10/2008 | Dwileski | |
| 2010/0107838 A1 | 5/2010 | Berg et al. | |
| 2010/0186640 A1 | 7/2010 | Leng | |
| 2010/0269649 A1 | 10/2010 | Rantz | |
| 2011/0239913 A1 | 10/2011 | Chung et al. | |
| 2014/0231602 A1 * | 8/2014 | Lifshitz | B25H 1/14 |
| | | | 248/165 |
| 2015/0196000 A1 | 7/2015 | Huang | |
| 2016/0069477 A1 | 3/2016 | Tabor | |
| 2016/0195200 A1 | 7/2016 | VanValkenburgh | |
| 2018/0193982 A1 | 7/2018 | Weber et al. | |
| 2021/0339375 A1 | 11/2021 | Verhagen et al. | |

FOREIGN PATENT DOCUMENTS

| | | |
|---|---|---|
| CN | 201205613 Y | 3/2009 |
| CN | 201848777 U | 6/2011 |
| CN | 202592233 U | 12/2012 |
| CN | 103831746 A | 6/2014 |
| CN | 104923600 A | 9/2015 |
| CN | 106272279 A | 1/2017 |
| CN | 107186676 A | 9/2017 |
| CN | 109746886 A | 5/2019 |
| DE | 304175 A | 1/1917 |
| DE | 825539 C | 12/1951 |
| DE | 1952798 U | 12/1966 |
| DE | 8019302 U1 | 12/1980 |
| DE | 3222812 A1 | 1/1983 |
| DE | 8708552 U1 | 7/1987 |
| DE | 3930367 A1 | 3/1991 |
| DE | 202011105979 U1 | 2/2012 |
| EP | 0238734 A1 | 9/1987 |
| EP | 1127662 A1 | 8/2001 |
| EP | 1939519 B1 | 6/2011 |
| KR | 1020110065198 A | 6/2011 |
| WO | 9425224 A1 | 11/1994 |
| WO | 0242035 A1 | 5/2002 |
| WO | 2012017425 A1 | 2/2012 |
| WO | 2019173088 A1 | 9/2019 |

OTHER PUBLICATIONS

Reed, "Chain Vise Tripod (R450+, R45OC, R45OP, R470+)" Replacement Parts List, Jun. 2016 (2 pages).

Reed, "04458—R450C—Tripod Pipe Vises—R450+, R470+, R40+," <https://www.reedmfgco.com/en/products/vises/tripods-r450-r470-r40/r450c/> web page publicly available at least as early as Aug. 6, 2019.

Ridgid, "TRISTAND Chain Vise, 460-12," Parts List, Jun. 2011 (1 page).

Ridgid, "TRISTAND Pipe Vise Instruction Sheet, 460-6/460-12-40-A," Jun. 2011 (4 pages).

* cited by examiner

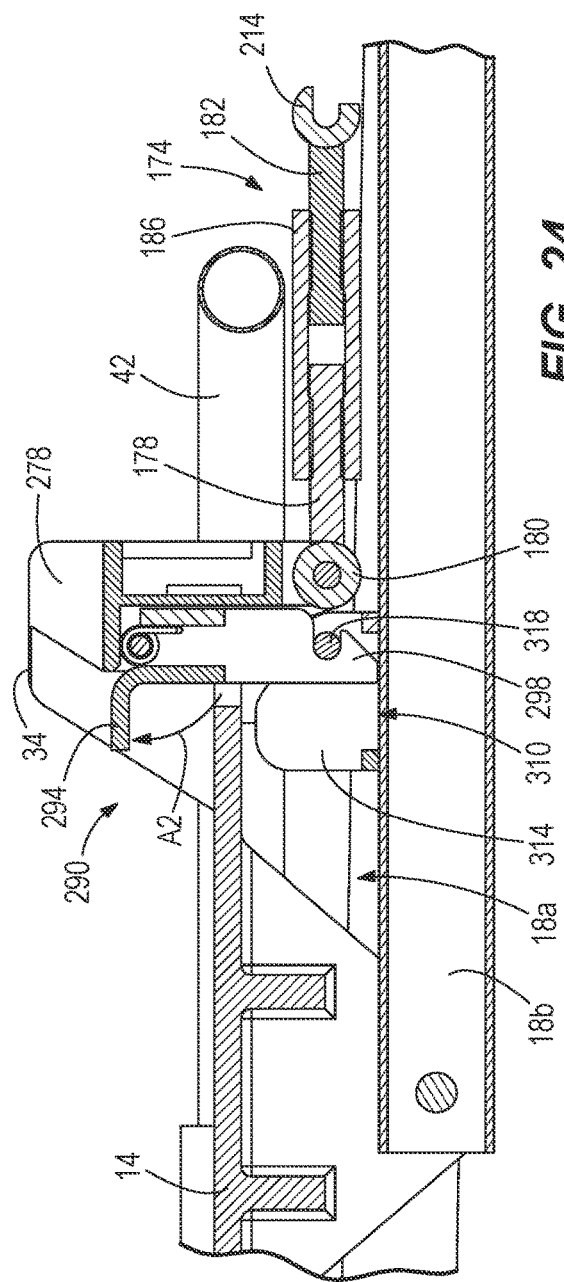

PIPE FITTING STAND

CROSS-REFERENCE TO RELATED APPLICATIONS

This application claims priority to U.S. Provisional Patent Application No. 63/080,854, filed on Sep. 21, 2020, and U.S. Provisional Patent Application No. 62/972,477, filed on Feb. 10, 2020, the entire contents of which is incorporated herein by reference.

FIELD OF THE INVENTION

The present invention relates to workpiece supporting stands, and more particularly to pipe fitting stands.

BACKGROUND OF THE INVENTION

Pipe fitting stands are generally used to support a pipe during various operations such as threading, cutting, welding, etc. Pipe fitting stands typically include a table providing an upwardly directed work surface and legs connected to the table.

SUMMARY OF THE INVENTION

The present invention provides, in one aspect, a pipe fitting stand for supporting a pipe during a work operation. The pipe fitting stand includes a table, a plurality of legs coupled to the table and movable between a deployed position and a stowed position, and a locking mechanism movable between a first position in which the locking mechanism engages at least one of the plurality of legs, and a second position in which the locking mechanism disengages the at least one of the plurality of legs. The locking mechanism is configured to secure the table in the stowed position in the second position.

The present invention provides, in another aspect, a pipe fitting stand for supporting a pipe during a work operation. The pipe fitting stand includes a table, a plurality of legs coupled to the table and movable between a deployed position and a stowed position, and a turnbuckle assembly movable between a first position in which the turnbuckle assembly engages one of the plurality of legs, and a second position in which the turnbuckle assembly disengages the one of the plurality of legs. When in the first position, the turnbuckle assembly is adjustable to exert a force against the one of the plurality of legs to maintain the legs in the deployed position and preclude any looseness between the table and the legs.

The present invention provides, in another aspect, a pipe fitting stand for supporting a pipe during a work operation. The pipe fitting stand includes a table, a plurality of legs coupled to the table and movable between a deployed position and a stowed position, and a locking mechanism movable between a first position in which the locking mechanism engages the plurality of legs, and a second position in which the locking mechanism disengages the plurality of legs. The locking mechanism includes a first member engagable with a first leg of the plurality of legs and a second member engagable with a second leg of the plurality of legs. The second member is configured to disengage the second leg before the first member disengages the first leg in response to the locking mechanism transitioning from the first position to the second position.

The present invention provides, in another aspect, a pipe fitting stand for supporting a pipe during a work operation. The pipe fitting stand includes a table, a plurality of legs coupled to the table and movable between a deployed position and a stowed position, a locking mechanism movable between a first position in which the locking mechanism engages the plurality of legs, and a second position in which the locking mechanism disengages the plurality of legs, and a turnbuckle assembly engagable with one of the plurality of legs in the deployed position. When in the second position, the locking mechanism is configured to secure the legs in the stowed position. The turnbuckle assembly is adjustable to exert a force against the one of the plurality of legs to maintain the legs in the deployed position and preclude any looseness between the table and the legs.

Other features and aspects of the invention will become apparent by consideration of the following detailed description and accompanying drawings.

BRIEF DESCRIPTION OF THE DRAWINGS

FIG. 24 is an enlarged perspective view of the pipe fitting stand of FIG. 1 in a folded state, illustrating the locking mechanism of FIG. 21 in a locked position and the turnbuckle assembly in the second position.

FIG. 25 is an enlarged perspective view of an alternative locking mechanism for the pipe fitting stand of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
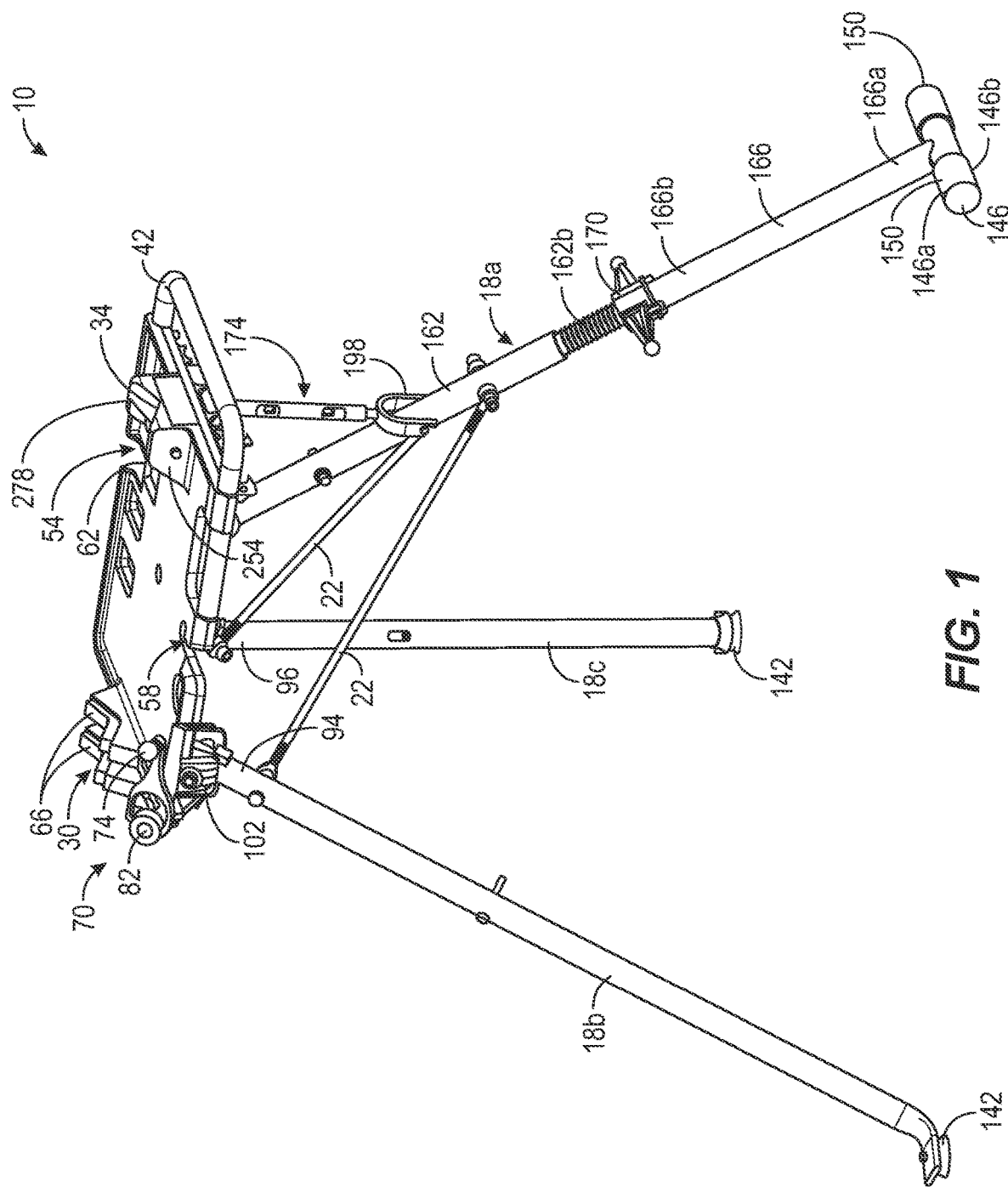
FIG. 1 is a perspective view of a pipe fitting stand in accordance with an embodiment of the invention.

FIG. 1 illustrates a pipe fitting stand 10 for supporting a pipe during a work operation. In the illustrated embodiment, the stand 10 includes a table 14 and three legs 18a-18c for supporting the table 14 in an elevated position with respect to a support surface. The stand 10 also includes two links 22 pivotably coupling a first of the legs 18a, respectively, with the other two legs 18b, 18c to coordinate movement of the legs 18a-18c as the stand 10 is reconfigured between a deployed state (shown in FIGS. 1-2) and a folded state (shown in FIG. 3).

With reference to FIG. 1, the table 14 is generally rectangular. An underside 26 of the table 14 includes a honeycomb structure (FIG. 6), which reduces the weight and increases the strength of the stand 10. The table 14 includes a vise 30 at one end thereof for supporting and clamping a pipe to the table 14 and a support 34 located on a side of the table 14 opposite the vice 30 to additionally support the pipe. The table 14 includes a supplemental grip 38 (FIG. 4) positioned below the vise 30. The supplemental grip 38 is a rounded piece of die cast molding a user may grasp during operation. An operating handle 42 extends from a first side 14a of the table 14 proximate the leg 18a. A portion of the operating handle 42 disposed along a second side 14b of the table 14 adjacent the first side 14a may be used as a side handle 42a (FIGS. 4-6) for a user to grasp during transport and/or operation of the stand 10. A vice handle 74 is additionally positioned on the second side 14b of the table 14, such that the table 10 may be carried in its folded state with the side handle 42a, locating the vice handle 74 on an opposite side of the folded table 10 as the ground, thereby protecting the vice handle 74 if the table is dropped. When the stand 10 is in the deployed state, tools may be stored on the operating handle 42 and/or the side handle 42a.

Figure 4:
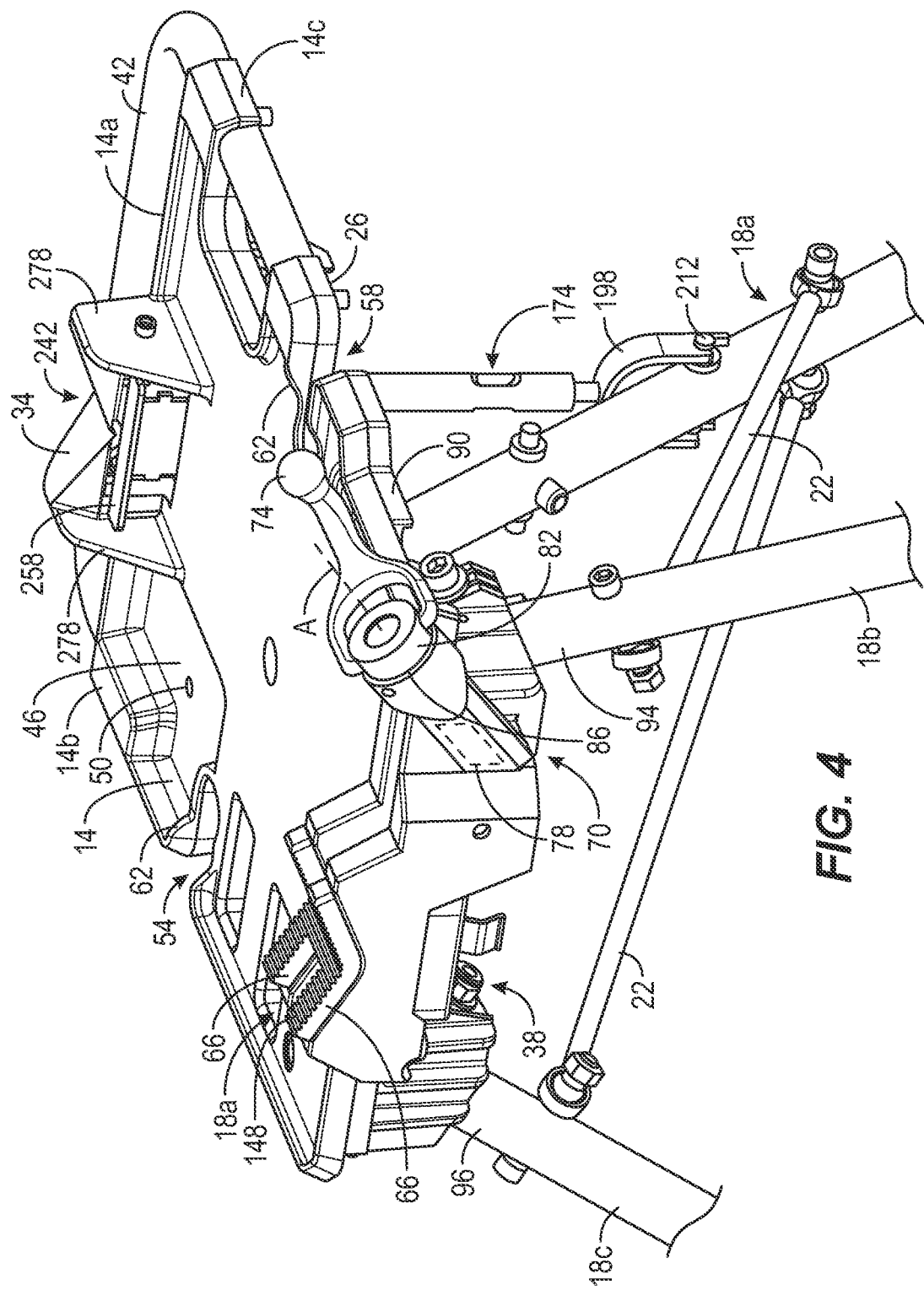
FIG. 4 is an enlarged perspective view of a table of the pipe fitting stand of FIG. 1.
Figure 5:
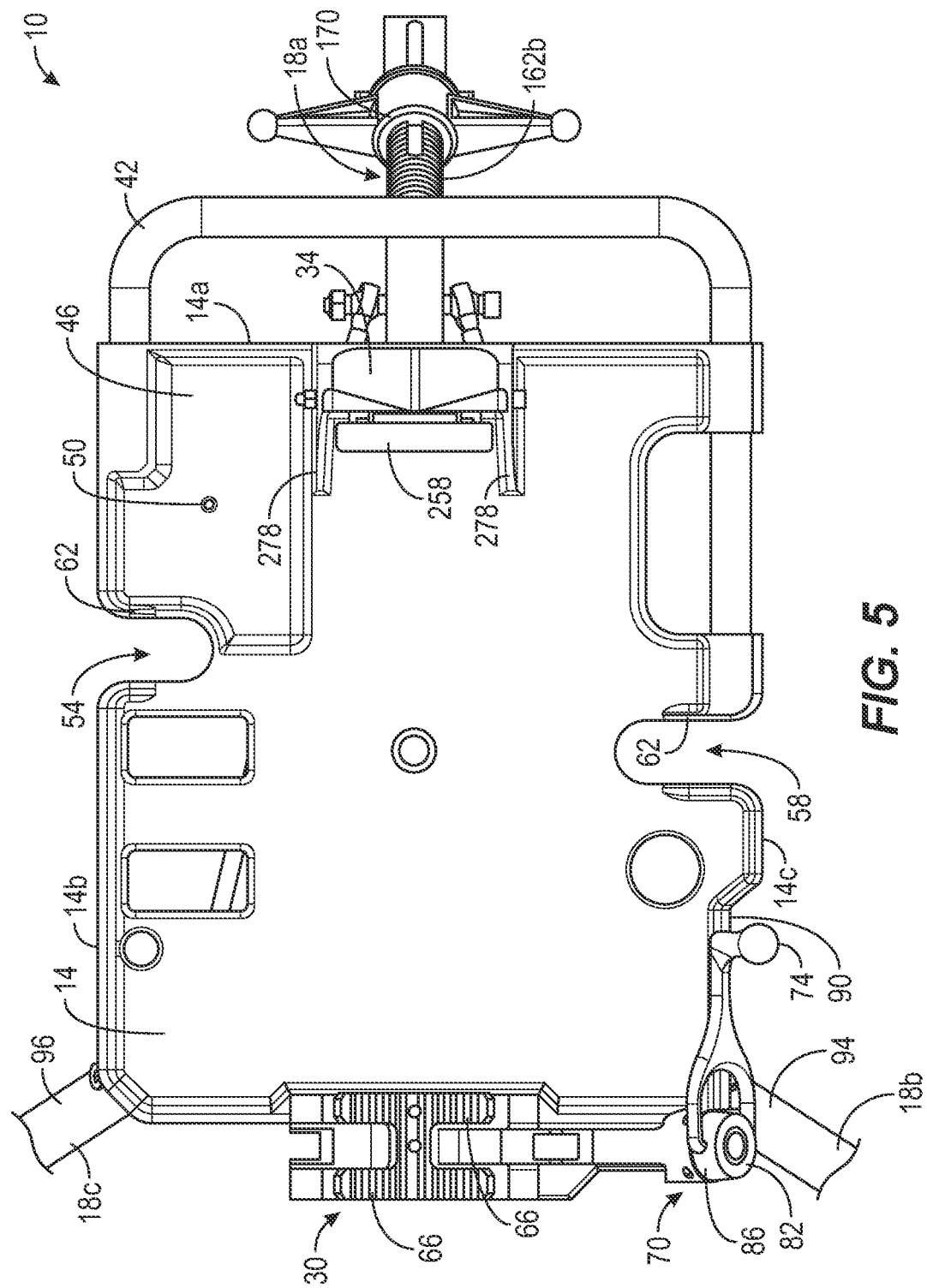
FIG. 5 is a top view of the table of the pipe fitting stand of FIG. 1.
Figure 6:
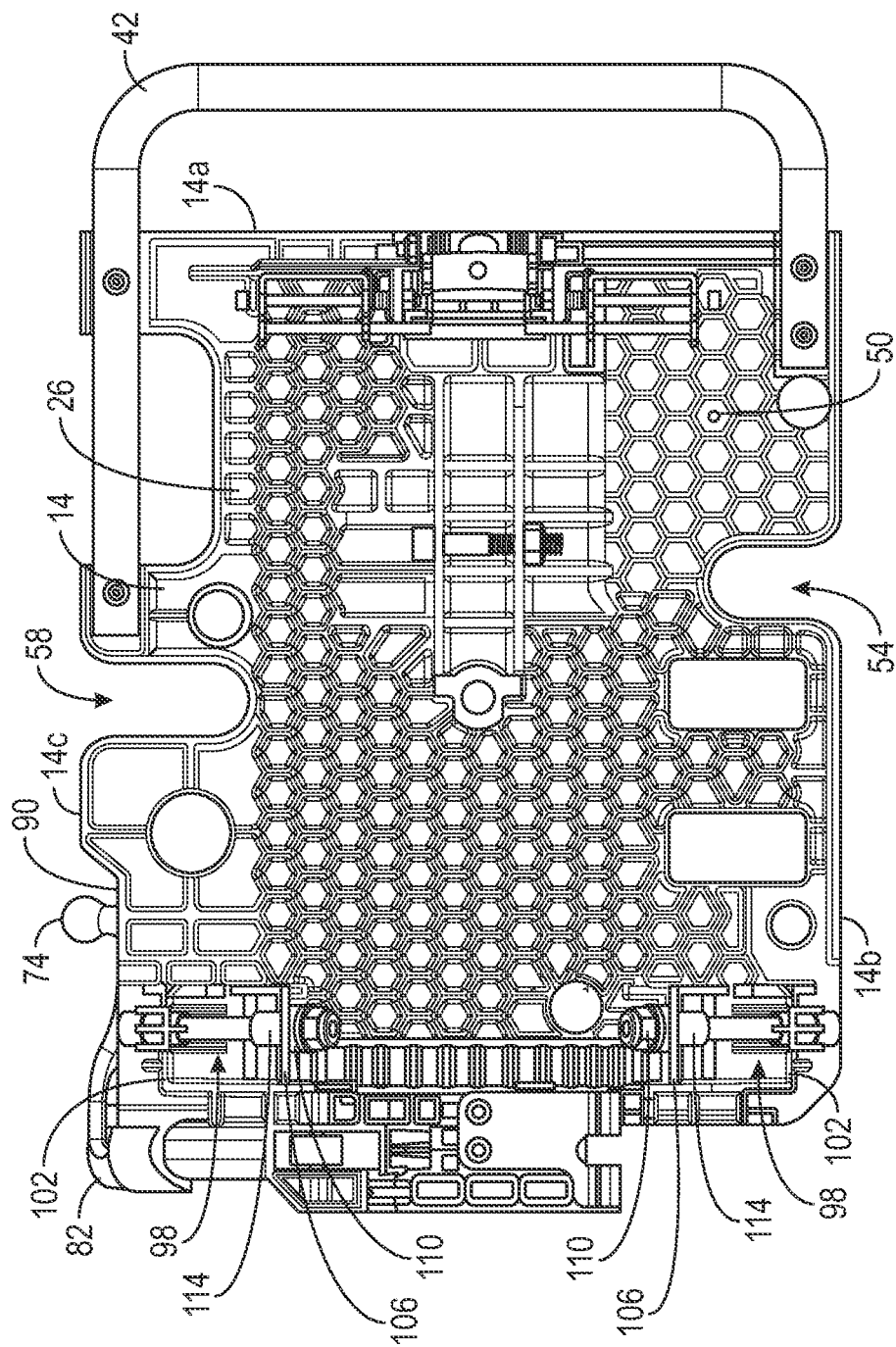
FIG. 6 is a bottom view of the table of the pipe fitting stand of FIG. 1.

With reference to FIGS. 4-5, the table 14 includes a recessed tray 46 positioned adjacent the first side 14a of the table 14. The recessed tray 46 includes an aperture 50 extending through the table 14. During operation, the tray 46 may hold utensils (e.g., pens, etc.), and liquid may drain through the aperture 50. The table 14 includes a first slot 54 extending through the second side 14b of the table 14, and a second slot 58 extending through a third side 14c of the table, which is opposite the second side 14b of the table 14. The first and second slots 54, 58 are shaped and sized to receive a handle of a power tool (e.g., a handsaw, a hammer, etc.). The first and second slots 54, 58 each include a lip 62 extending around a periphery of the slots 54, 58. The lips 62 are slanted inwardly and ramp down to be flush with the table 14, such that the lips 62 contain the power tool handle in the slots 54, 58. Additionally, the table 14 includes a rim 64 extending around a perimeter of the table 14. The rim 64 is raised above an uppermost surface of the table 14 such that a user may hang power tools and other items on the rim 64.

With continued reference to FIGS. 4-5, the vice 30 includes a pair of jaws 66 for supporting the pipe and a clamp assembly 70 for applying a clamping force to the pipe within the jaws 66. The clamp assembly 70 includes a handle 74 and a chain screw assembly 78 secured to each other via a nut 82. The chain screw assembly includes a pin (not shown) and a screw (not shown). The clamp assembly 70 includes dual thrust washers 86, which decrease wear of the clamp assembly 70 and the table 14, which is induced by the axial rotation of the nut 82. The handle 74 is seated within slots (not shown) oriented on opposite sides of the nut 82. The clamp assembly 70 also includes a chain (not shown) having a first end connected with the screw, and an opposite, free end. The chain screw 78 is oriented along an axis A that is oriented at an angle (e.g., 40 degrees) with an edge of the table 14. In some embodiments, the axis A is parallel with the edge of the table and on the same plane as the table 14. The second side 14b of the table includes a cut-out 90 (FIGS. 4-6) partially extending into the third side 14c of the table 14 in order to allow the handle 74 to rotate without interfering with the table 14.

During use, a user may place the pipe on the jaws 66 and support 34 and wrap the chain around the pipe. To secure the chain, the free end of the chain is temporarily latched to the table 14 on an opposite side as the clamp assembly 70. The user then rotates the handle 74, thereby turning the nut 82 and translating the chain screw 78 away from the jaws 66, tensioning the chain and tightening it around the pipe.

With reference to FIG. 4, the jaws 66 of the vise 30 includes a first side 66a composed of a metal serrated edge, and a second side (not shown) integrated with a softer, rubber (e.g., neoprene) coating. The first side 66a of the jaws 66 further includes a plurality of teeth 148, such that the teeth 148 are spaced at a variable pitch from each other. The tooth pitch varies from the inside of the jaws 66 to the outside of the jaws 66. More specifically, the tooth pitch gradually increases from the inside to the outside. In the illustrated embodiments, the jaws 66 are secured to the vice 30 via fasteners (e.g., bolts). In alternative embodiments, the jaws 66 are loosely positioned within the vice 30. More specifically, the jaws 66 are adjustable relative to the table 14 such that a user selectively repositions the jaws 66 with either the first side 66a or the second side (with the rubber coating) facing upwards to receive the pipe.

Figure 8:
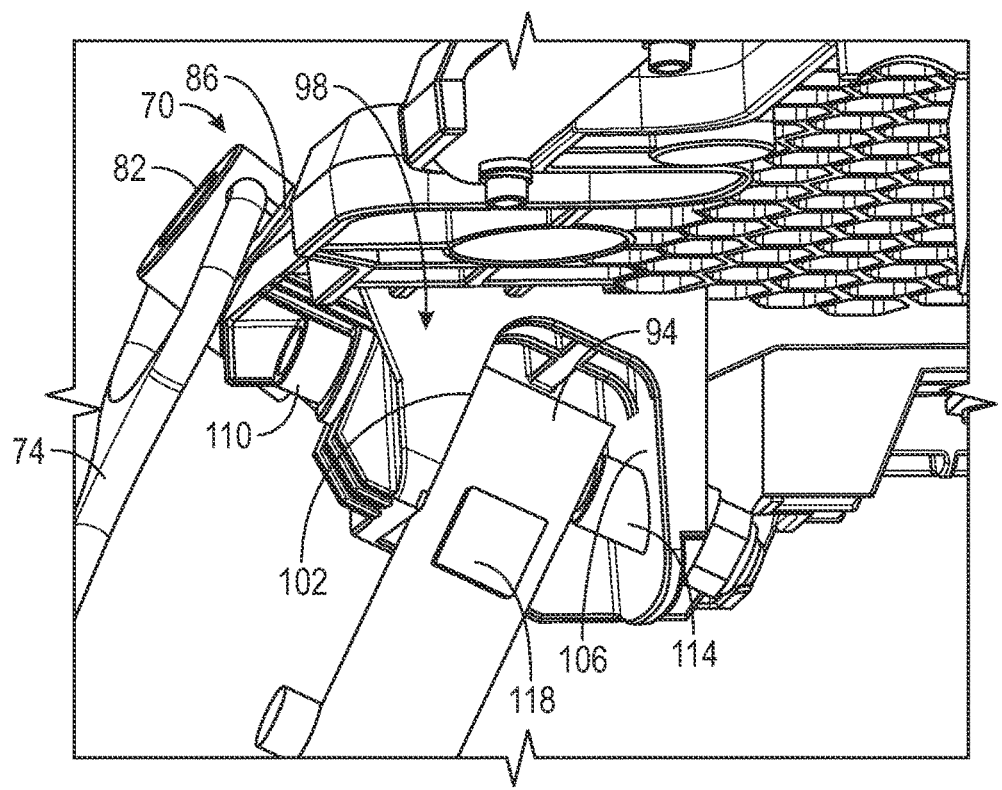
FIG. 8 is an enlarged perspective view of an underside of the table of FIG. 1.
Figure 9:
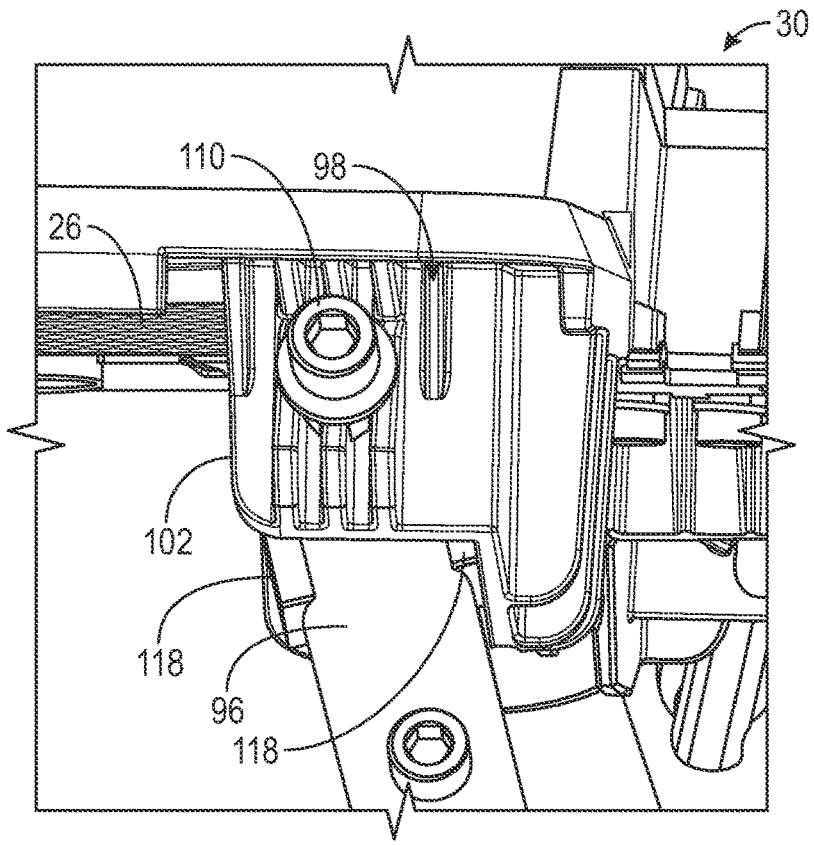
FIG. 9 is an enlarged perspective view of a side of the table of FIG. 1.

Each of the legs 18a-18c is separately pivotably coupled to the table 14. However, as mentioned above, the links 22 interconnect the legs 18a, 18b and the legs 18a, 18c, respectively, such that pivoting movement of the leg 18a relative to the table 14 causes the other legs 18b, 18c to also pivot relative to the table 14. With reference to FIGS. 8-9, a distal end 94 of the second leg 18b and a distal end 96 of the third leg 18c are positioned within brackets 98 formed on the underside 26 of the table 14. Each of the brackets 98 includes a first, angled wall 102, and a second, vertical wall 106, opposing the first wall 102. A fastener 110 extends through the bracket 98 and the distal ends 94, 96 of the second and third legs 18b, 18c, coupling the legs 18b, 18c to the table 14. A spacer 114 is seated on the fastener 110, between the distal end 94, 96 of each of the legs 18b, 18c and the vertical wall 106, thereby urging the legs 18b, 18c toward the angled wall 102. Stops 118 are coupled (e.g., welded) to the distal ends 94, 96 of the legs 18b, 18c. The distal end 94, 96 of each of the legs 18b, 18c include one stop 118 positioned on opposing sides of the legs 18b, 18c, such that the stops 118 engage the bracket 98 when the table 14 is deployed. Engagement of the stops 118 against the table 14 precludes or eliminates any looseness between the legs 18b, 18c and the table 14, and prevents motion of the legs 18b, 18c past the deployed position.

Figure 7A:
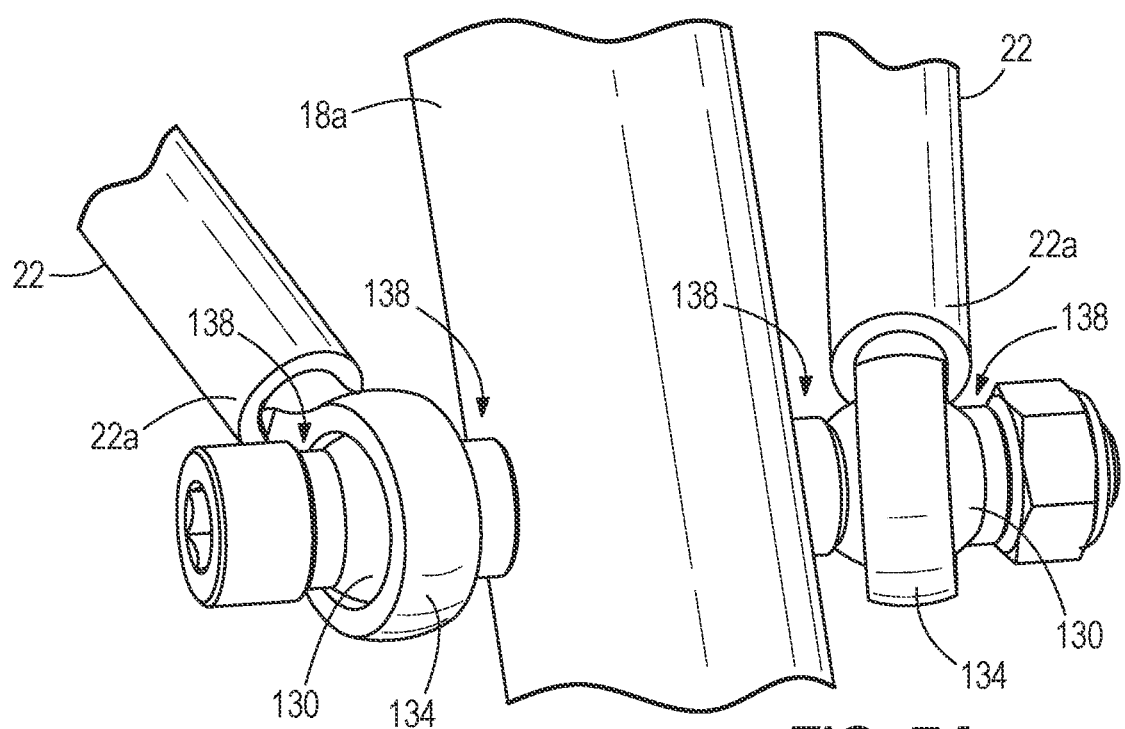
FIG. 7A is an enlarged perspective view of a coupling mechanism for a first leg of the pipe fitting stand of FIG. 1.
Figure 7B:
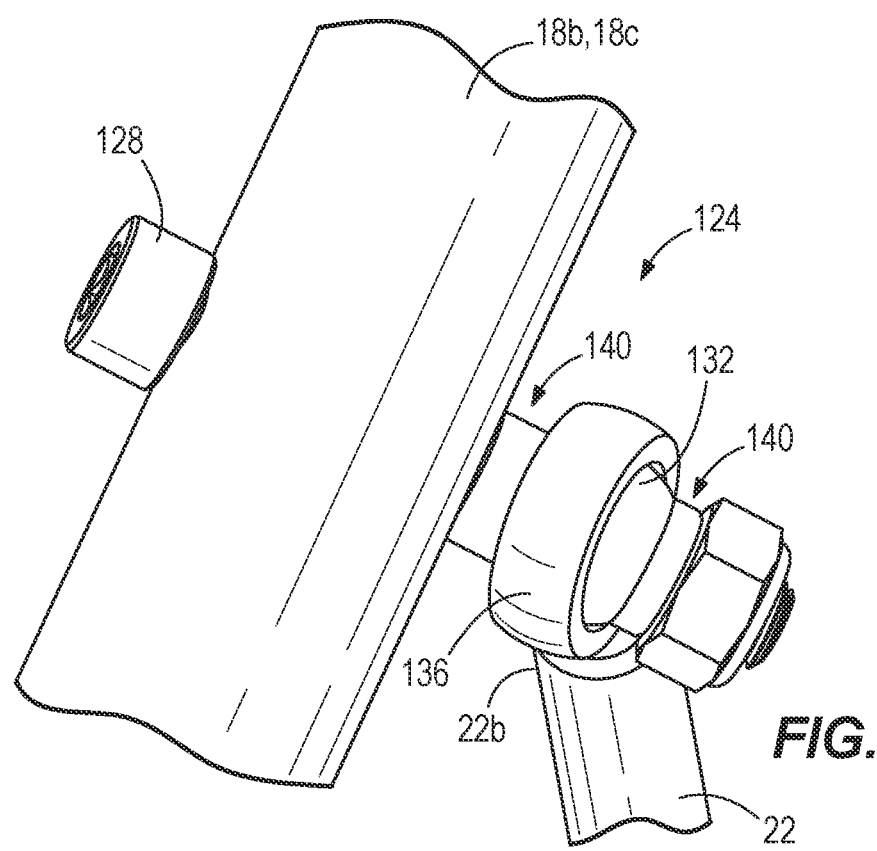
FIG. 7B is an enlarged perspective view of a coupling mechanism for a second leg and a third leg of the pipe fitting stand of FIG. 1.

With reference to FIGS. 7A and 7B, the links 22 are coupled to the first leg 18a via a first coupling mechanism 122 and to the second and third legs 18b, 18c via a second coupling mechanism 124. The first coupling mechanism 122 includes a rod (e.g., a bolt, not shown) extending through the leg 18a, and ball joints 130 on opposite ends of the rod. A first end 22a of the leg links 22 include a first coupler 134, which couple to the ball joints 130, allowing the leg links 22 a large range of motion. Spacers 138 are positioned on either side of each of the ball joints 130 in order to provide maximum motion for first coupler 134, and thereby the leg links 22. Similarly, the second coupling mechanism 124 includes a rod 128 extending through the legs 18b, 18c, and a ball joint 132 positioned on one end of the rod 128. A second end 22b of each of the leg links 22 includes a second coupler 136, which couples to the ball joint 132. Spacers 140 are positioned on either side of the ball joint 132.

Figure 10A:
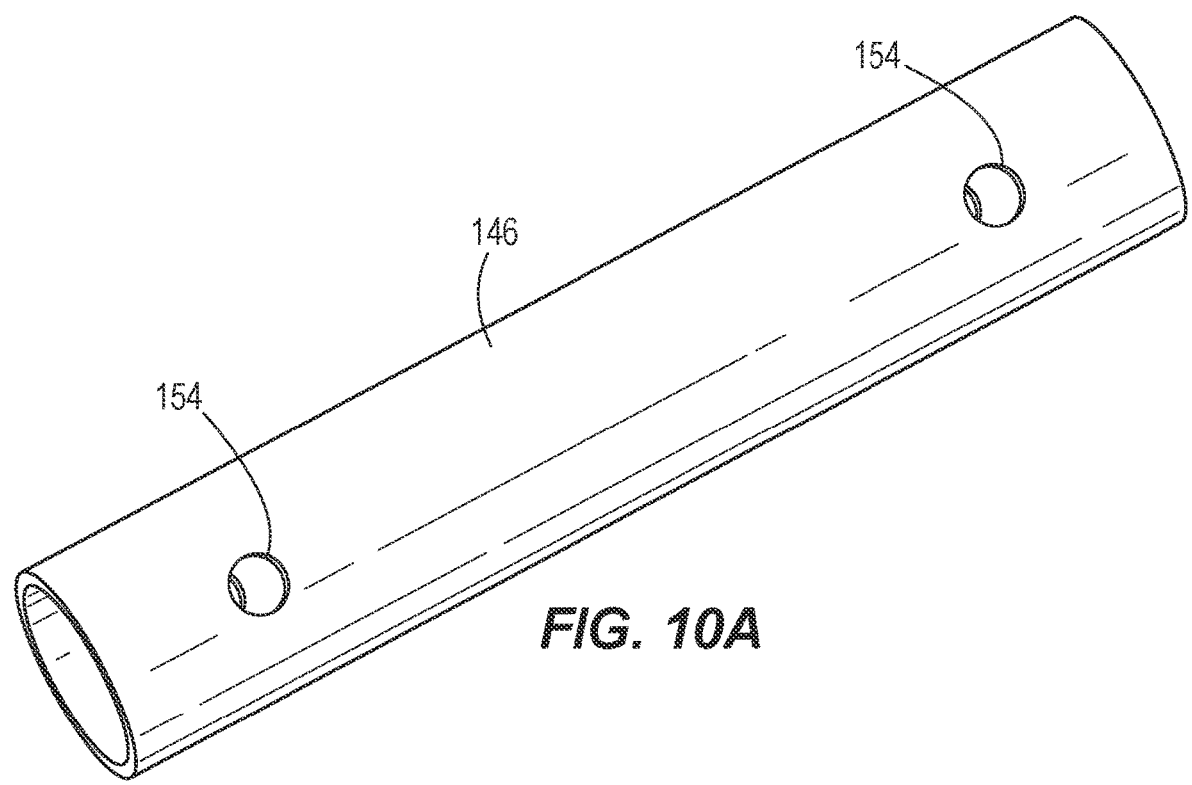
FIG. 10A is a perspective view of a mount coupled to the first leg of the pipe fitting stand of FIG. 1.
Figure 10B:
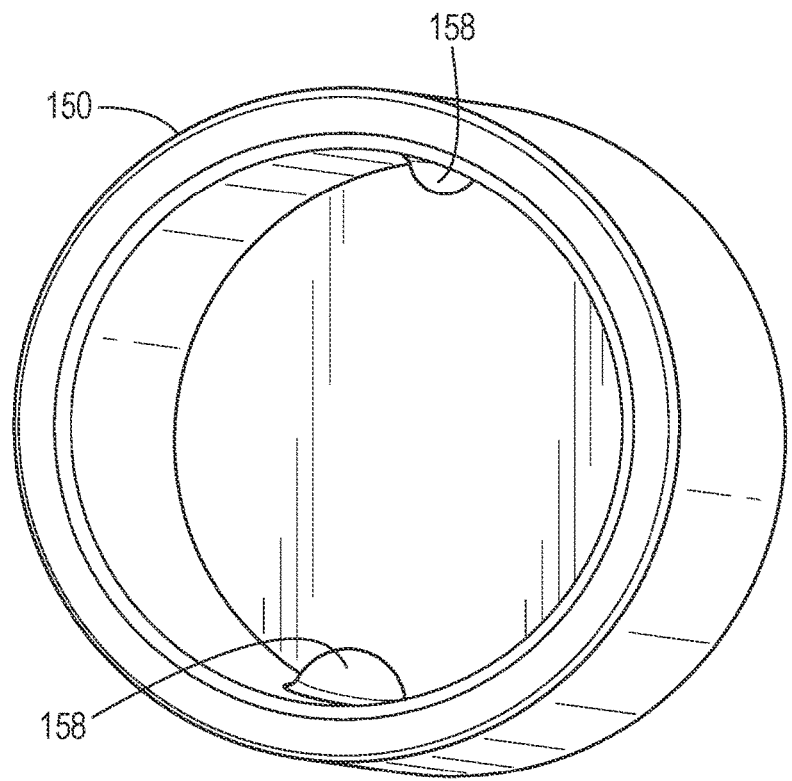
FIG. 10B is a perspective view of a rubber cap coupled to the first leg of the pipe fitting stand of FIG. 1.

The second and third legs 18b, 18c each include a pad 142 (FIGS. 1-3) engageable with the ground. The pads 142 are composed of a rubber material and are secured to an underside of the legs 18b, 18c via a fastener (e.g., a screw and a lock washer). The first leg 18a includes a mount, or T-bar leg, 146 engageable with the ground. In the illustrated embodiment, the mount 146 is a pipe welded to the leg 18a and substantially perpendicular to the leg 18a. The mount 146 includes rubber caps 150 (FIG. 1) positioned on distal ends of the pipe. With reference to FIGS. 10A and 10B, the mount 146 includes cylindrical apertures 154 extending therethrough. The apertures 154 are shaped and sized to receive corresponding detents 158 positioned on an inner surface of the rubber caps 150. When the rubber caps 150 are positioned on the mount 146, the detents 158 engage the apertures 154, thereby securing the rubber caps 150 to the mount 146. To remove the rubber caps 150 from the mount 146, the user depresses the detents 158 into the apertures 154, and then slides the rubber caps 150 off of the mount 146. Once the caps 150 are removed, the user may anchor the stand 10 to a work surface.

When deploying the stand 10, the operator can balance the stand 10 in the deployed state on the mount 146. Additionally, the user may depress a top surface 146a of the mount 146 with his/her foot in order to maintain a bottom surface 146b of the mount in contact with the ground. Specifically, while maintaining pressure on the mount 146, the user may steadily pivot the stand 10 toward the deployed state. The rubber caps 150 and the pads 142 maintain contact with the ground for accurate and safe deployment of the stand. In alternative embodiments, the mount 146 may include different shapes and sizes.

Figure 2:
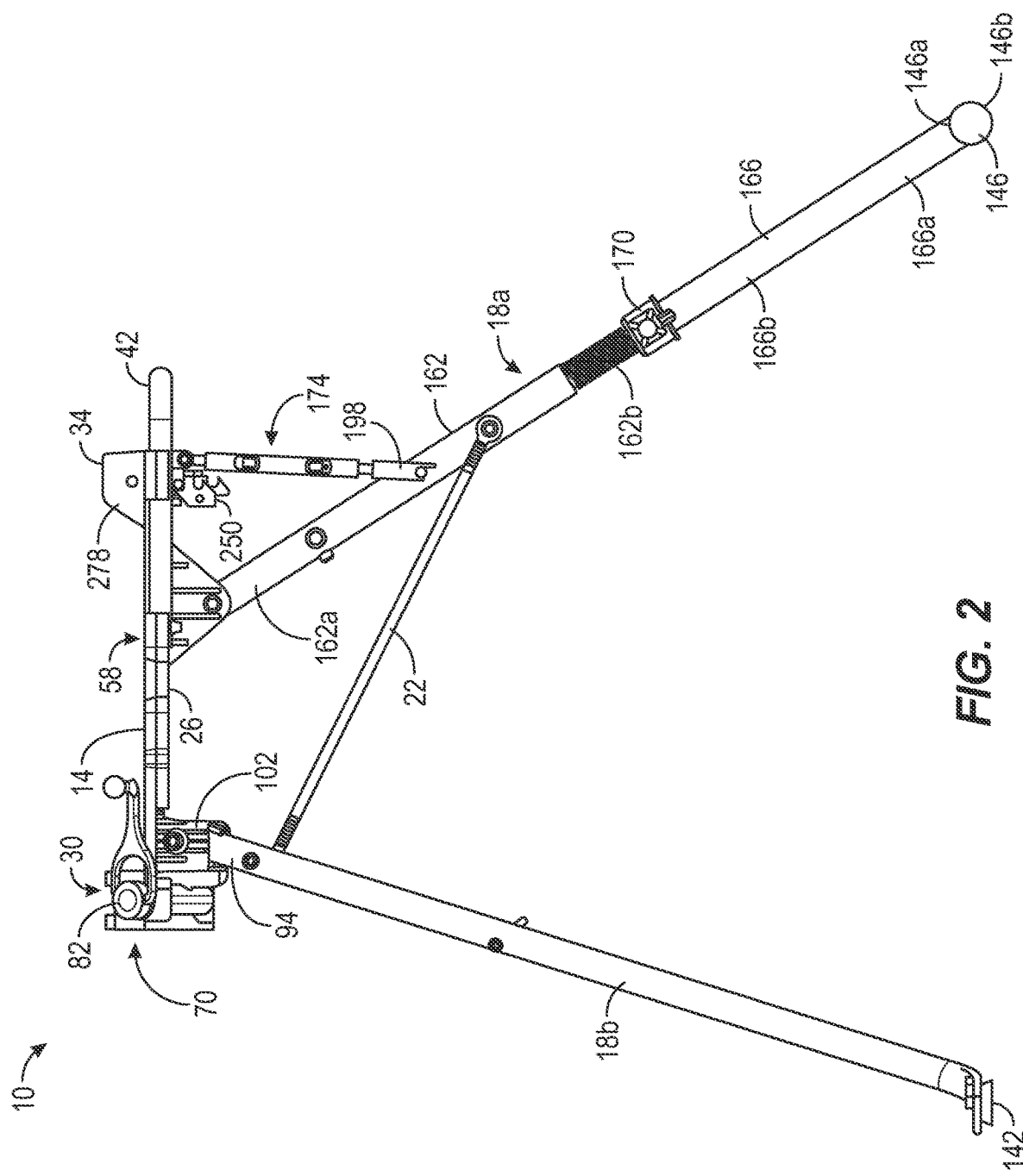
FIG. 2 is a side view of the pipe fitting stand of FIG. 1 in a deployed state.

With reference to FIGS. 1 and 2, the leg 18a is substantially adjustable. The leg 18a includes a first, top portion 162 and a second, bottom portion 166. The first portion 162 includes a first end 162a attached to the table 14, and a second end 162b, which is threaded. The second portion 166 includes a first end 166a attached to the mount 146, and a second end 166b rotationally coupled and axially fixed to a jack handle 170. Specifically, the jack handle 170 includes a threaded aperture configured to threadably receive the second end 162b of the top portion 162 of the leg 18a.

During operation, a user adjusts the length of the adjustable leg 18a in order to change the level of the table, and therefore the stand 10. More specifically, when the user rotates the jack handle 170, the second portion 166 of the leg 18a translates with respect to the first portion 162 of the leg 18a, thereby increasing or decreasing the length of the leg 18a.

Figure 11:
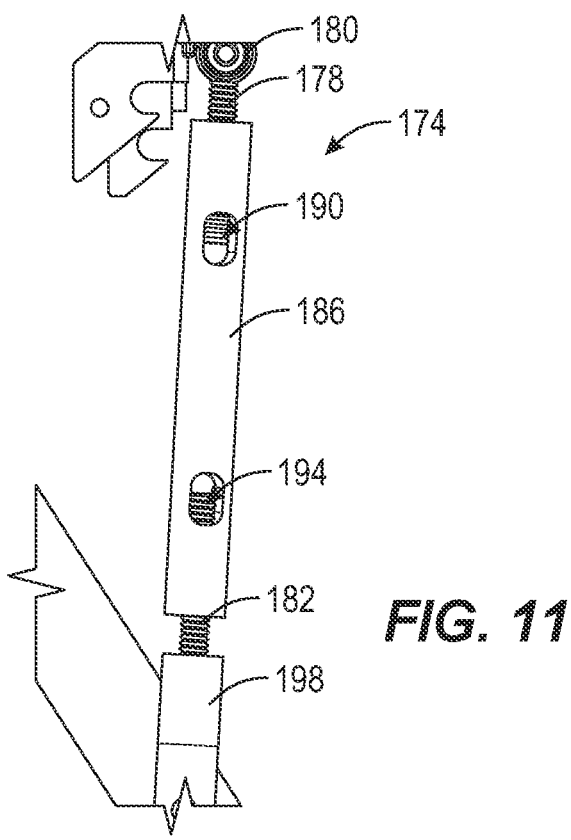
FIG. 11 is a side perspective view of a turnbuckle assembly of the pipe fitting stand of FIG. 1.
Figure 12:
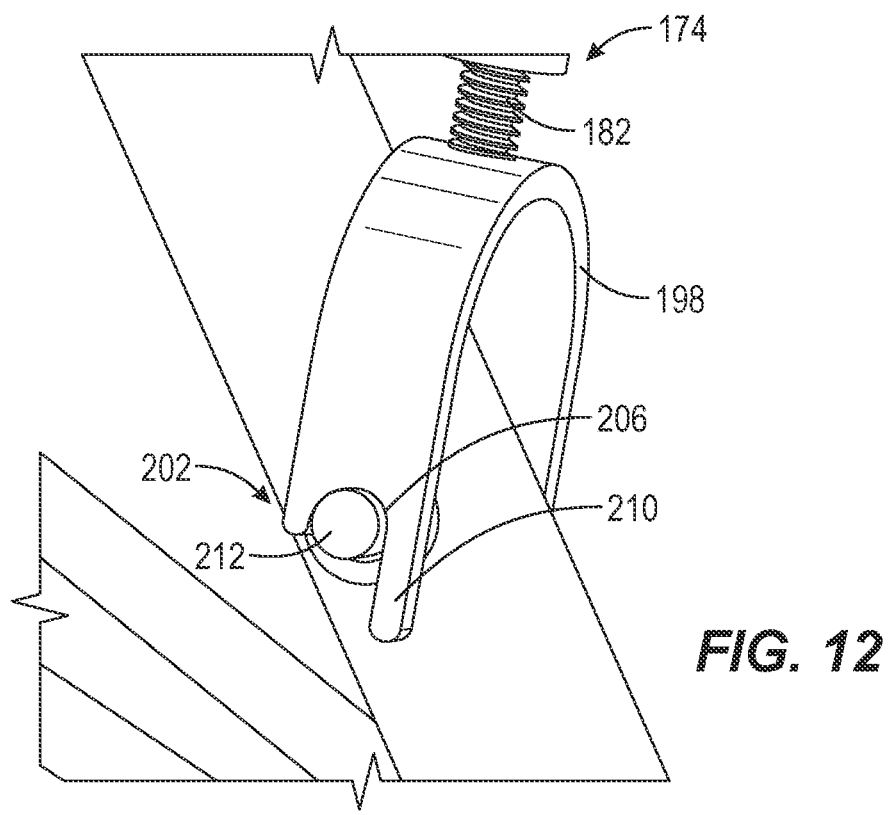
FIG. 12 is a perspective view of a yoke of the turnbuckle assembly of FIG. 10.
Figure 17:
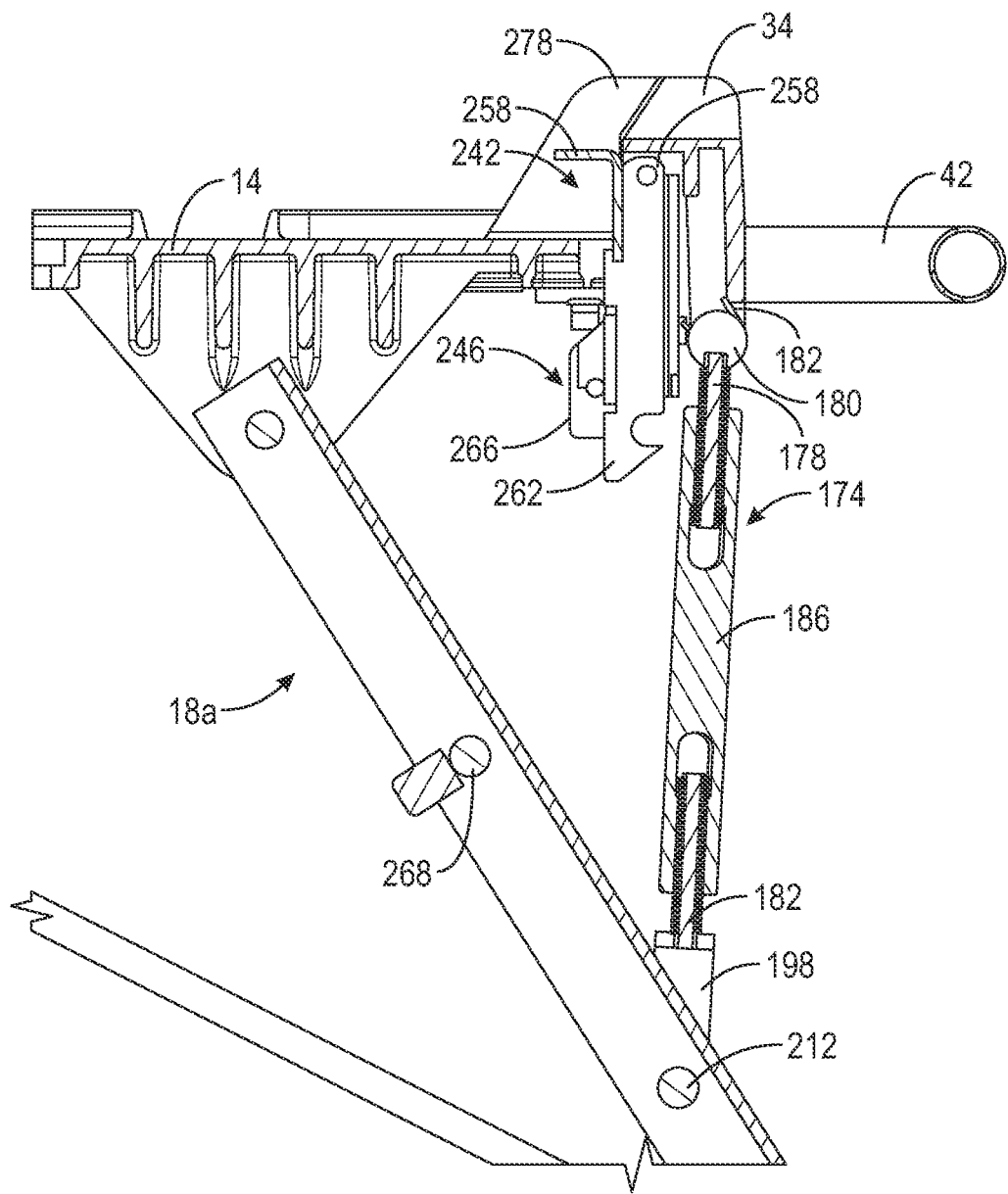
FIG. 17 is an enlarged side view of the pipe fitting stand of FIG. 1 in a deployed state, illustrating the locking mechanism in an unlocked position and the turnbuckle assembly in a first position.
Figure 19:
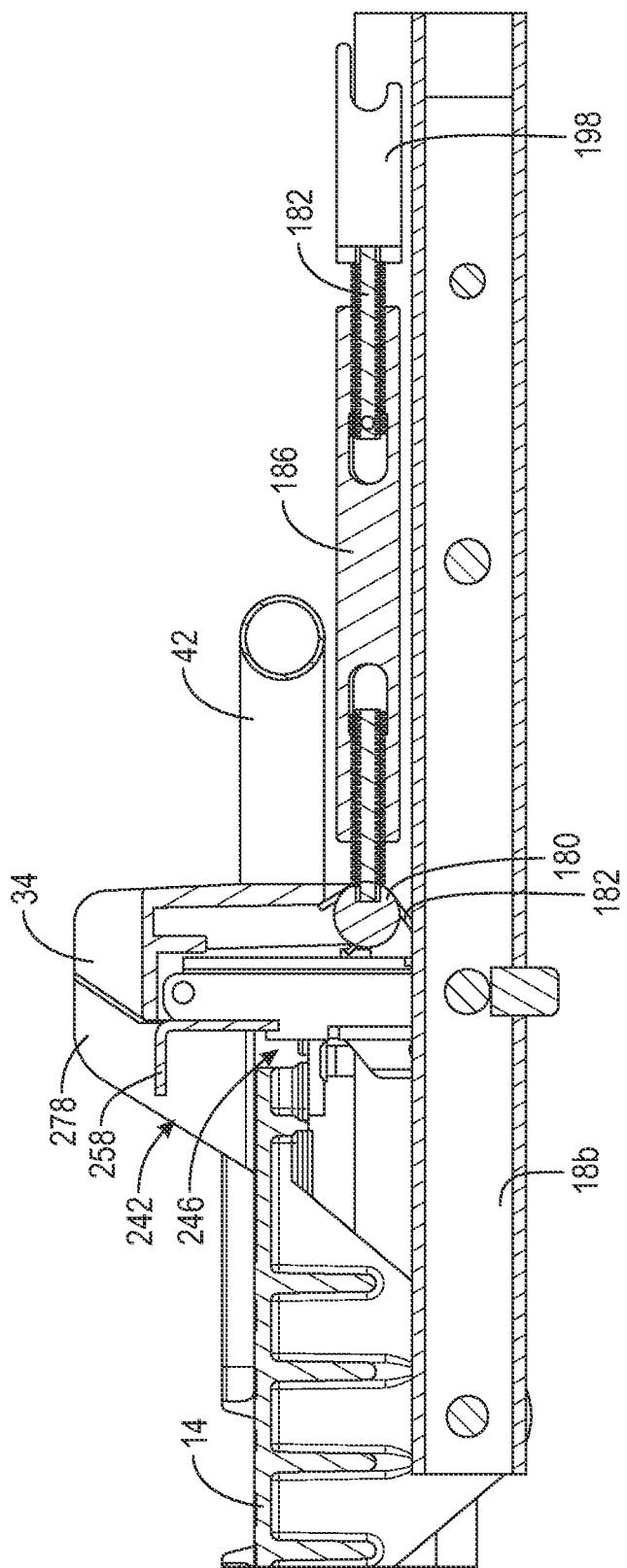
FIG. 19 is an enlarged side view of the pipe fitting stand of FIG. 1 in a folded state, illustrating the locking mechanism in a locked position and the turnbuckle assembly in the second position.

The stand 10 also includes a turnbuckle assembly 174 extending between the table 14 and the leg 18a for selectively preloading the leg 18a against the table 14, thereby precluding or eliminating any looseness between the table 14 and the legs 18a-18c. The turnbuckle assembly 174 includes a first threaded rod 178, a second threaded rod 182, and a spreader 186 threadably coupled to the first and second threaded rods 178, 182 (FIG. 11). The first and second threaded rods 178, 182 include trapezoidal threads. The trapezoidal threads increase a pitch of the threads, thereby allowing for increased lateral movement and less rotation of the rods 178, 182. The spreader 186 is manipulated by the user to selectively tighten or loosen the turnbuckle assembly 174, thereby increasing or decreasing, respectively, the effective length of the turnbuckle assembly 174. With reference to FIG. 11, a first slot 190 and a second slot 194 extend through the spreader 186 adjacent the first threaded rod 178 and the second threaded rod 182, respectively. The slots 190, 194 allow for the distal ends of the first and second rods 178, 182 to be accessed and staked, thereby preventing the rods 178, 182 from being removed from the spreader 186. As shown in FIG. 11, the turnbuckle assembly 174 also includes a cylindrical bushing 180 pivotably coupling the threaded rod 178 to the underside of the table 14, a biasing member 182 (e.g., a double torsion spring, FIGS. 17 and 19) coupled to the bushing, and a U-shaped yoke 198 at the distal end of the threaded rod 182. Distal ends 202 of the yoke 198 include a semi-circular groove 206 and an elongate flat 210 (FIG. 12). The semi-circular groove 206 engages a first pin 212 extending through the first leg 18a. The elongate flat 210 provides a "catch" against the first pin 212 as the user loosens or tightens the turnbuckle assembly 174. The biasing member 182 biases the yoke 198 away from the first pin 212 when the yoke 198 is disengaged from the first pin 212. Specifically, once the turnbuckle assembly 174 is loosened such that the flat 210 disengages the first pin 212, the turnbuckle assembly 174 pivots in a counterclockwise direction. In some embodiments (FIGS. 22-24), the distal end of the threaded rod 182 includes a partial-cylindrical bushing 214, rather than the yoke 198.

For additional storage, the stand 10 also includes a shelf 218 (FIGS. 13-14) positioned beneath the table 14. The shelf 218 is generally triangular and includes hook portions 222 positioned at each corner of the shelf 218. The shelf 218 is removably coupled to the legs 18a-18c. More specifically, the shelf 218 is mounted to the legs 18a-18c via gravity and self-locks at a certain point. During assembly of the stand 10, the user positions the shelf 218 directly under the table 14. Upon releasing the shelf 218, it will slide downwardly along the legs 18a-18c. Depending on how far the legs 18a-18c are splayed, the shelf 218 will be unable to continue sliding past a certain point and will self-lock relative to the legs 18a-18c.

Figure 13:
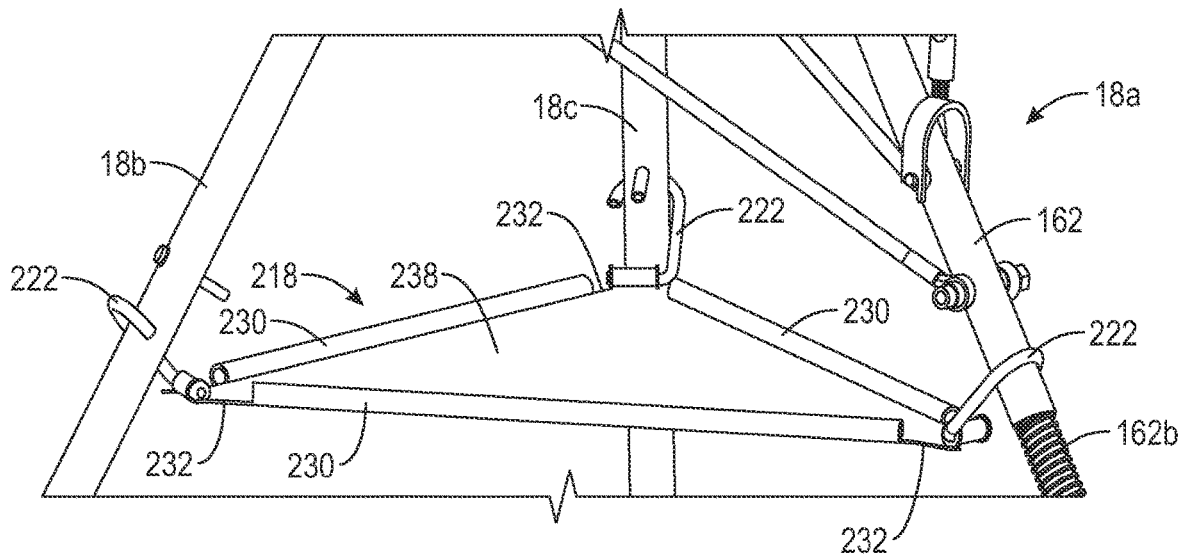
FIG. 13 is an enlarged perspective view of the pipe fitting stand of FIG. 1 including a shelf.
Figure 14:
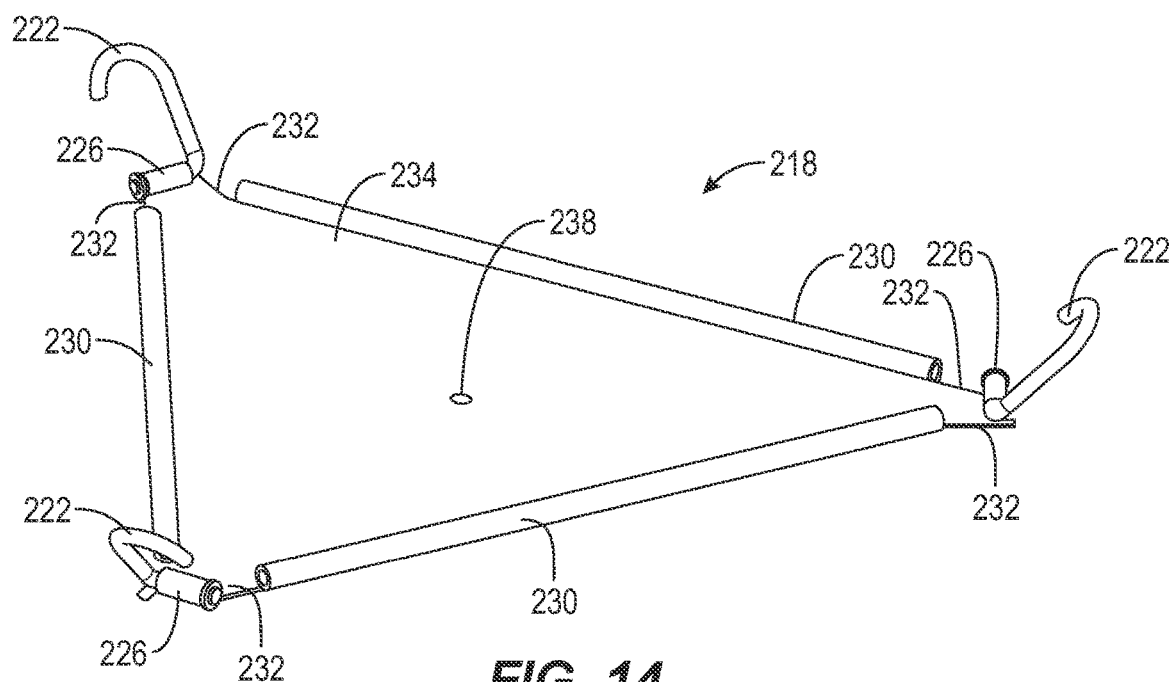
FIG. 14 is a perspective view of the shelf of the pipe fitting stand of FIG. 1.
Figure 15:
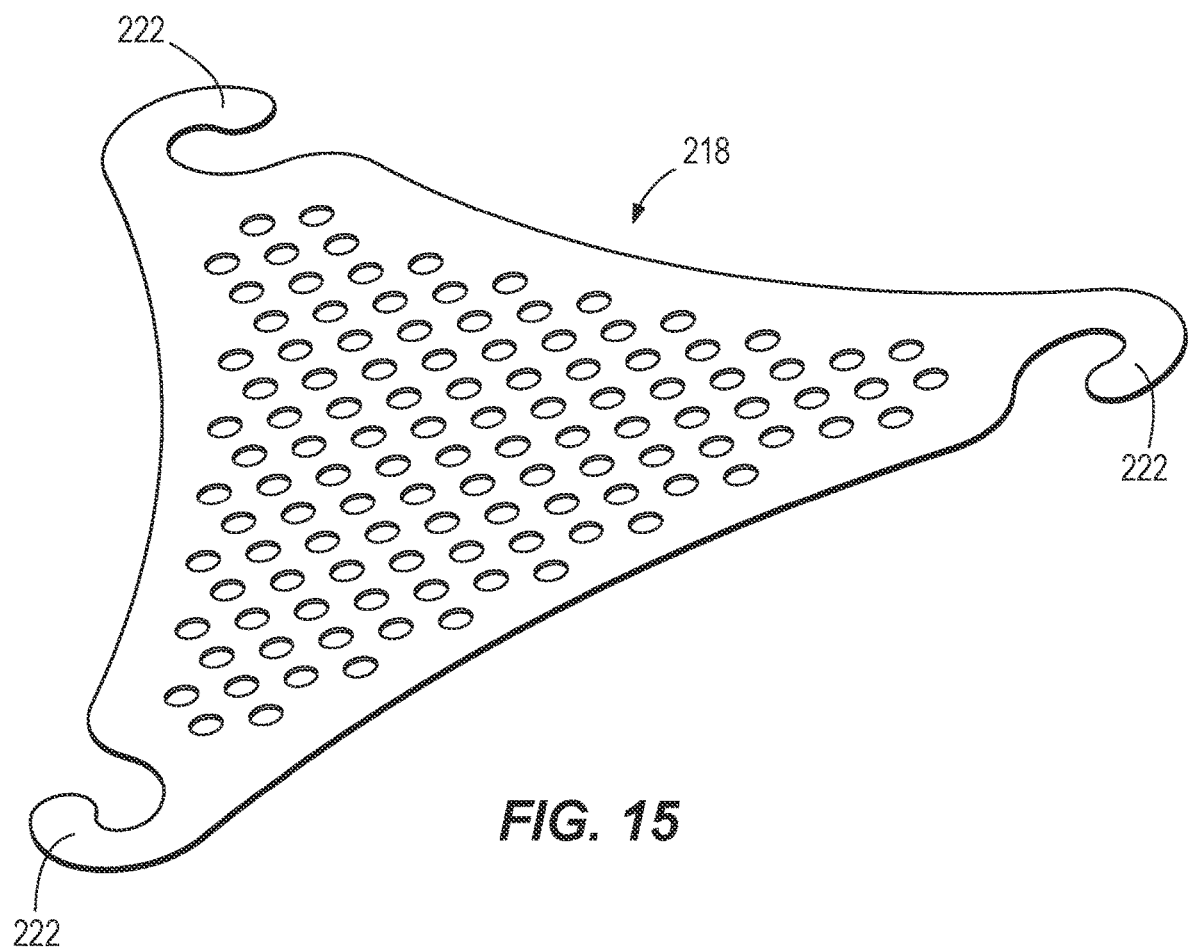
FIG. 15 is a perspective view of an alternative embodiment of the shelf.

With continued reference to FIGS. 13-14, the hook portions 222 are pivotable relative to the shelf 218. Each of the hook portions 222 includes a straight portion 226, which pivots relative to the corners of the shelf 218, thereby allowing the hook portions 222 to pivot out of the way (e.g., inwardly) during transport or storage, preventing damage to the hook portions 222. Edges 230 of the shelf 218 are raised relative to an inner periphery 234 of the shelf 218 to prevent the user from injuring their shins in the event they bump into the shelf 218. The raised edges 230 have gaps 232 adjacent the corners of the shelf 218 to facilitate the drainage of fluid off the shelf 218. The shelf 218 further includes an aperture 238 extending therethrough. In some embodiments, the raised edges 230 do not include the gaps 232. Rather, the shelf 218 includes barrels welded onto corners of the shelf 218. The hook portions 222 may pivot into the barrels for transport or storage, thereby preventing damage to the hook portions 222. During operation, the shelf 218 may hold utensils and/or tools, and liquid may drain through the aperture 238. With reference to FIG. 15, in some embodiments, the hook portions 222 are cutouts and are integrally formed with the shelf 218 and are stationary (e.g., not pivotable).

In order to remove the shelf 218 from the stand 10, the user lifts the shelf 218 relative to the table 14 and rotates the shelf 218 in a clockwise direction. Upon rotating the shelf 218, the hook portions 222 disengage the legs 18a-18c and the shelf 218 may be removed from the stand 10.

Figure 3:
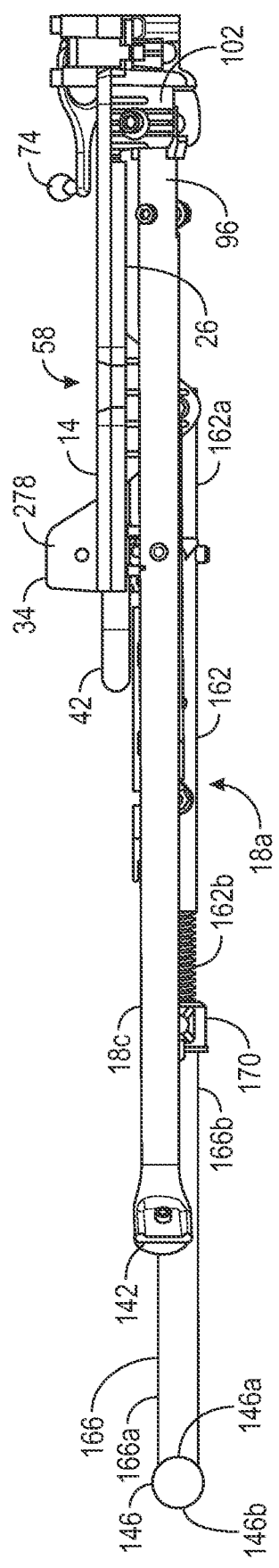
FIG. 3 is a side view of the pipe fitting stand of FIG. 1 in a folded state.
Figure 16:
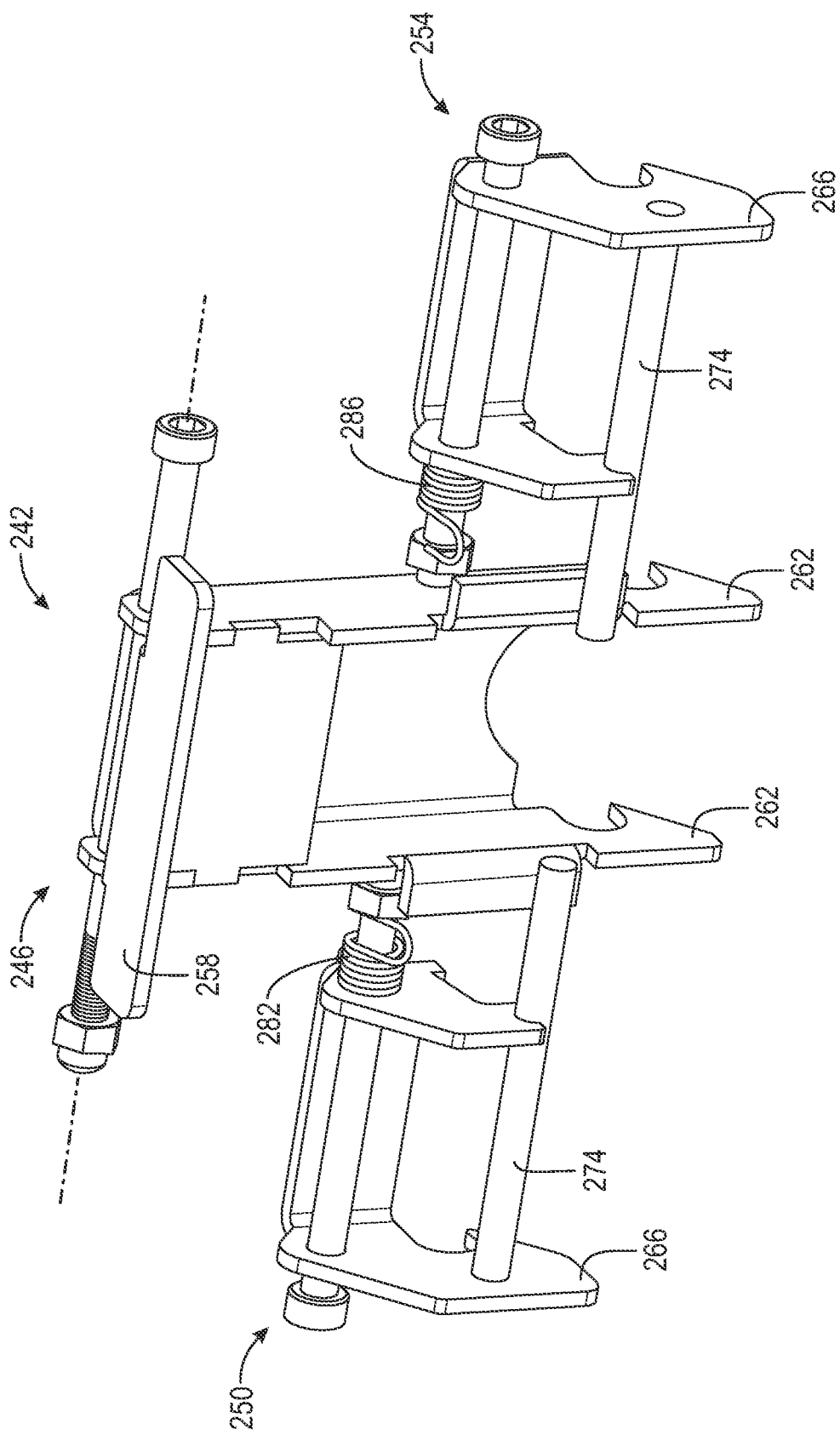
FIG. 16 is a perspective view of a locking mechanism of the pipe fitting stand of FIG. 1.

With reference to FIG. 16, the stand 10 also includes a locking mechanism 242 extending between the table 14 and the leg 18a for selectively locking the leg 18a into the folded position (shown in FIG. 3). Because the other legs 18b, 18c are connected to the adjustable leg 18a via the links 22, the legs 18a-18c are simultaneously moved into the deployed position, and locked in the deployed position via the engagement between the adjustable leg 18a and the turnbuckle assembly 174. Additionally, the legs 18a-18c are simultaneously moved into the folded position and locked in the folded position via engagement between the legs 18a-18c and the locking mechanism 242.

The locking mechanism 242 includes a first locking member 246, a second locking member 250, and a third locking member 254. The second and third locking members 250, 254 are positioned on opposite sides of the first locking member 246. The second and third locking members 250, 254 are coupled to the first locking member 246. The first locking member 246 selectively engages the adjustable leg 18a, and the second and third locking members 250, 254 selectively engage the second and third legs 18b, 18c, respectively.

The first locking member 246 is a single, unitary piece including a latch handle 258 and a pair of hooks 262. Similarly, the second and third locking members 250, 254 are unitary members including a single hook 266. When the stand 10 is in the folded state, the hooks 262 of the first locking member 246 engage a second pin 268 extending through the first leg 18a, and the hooks 266 of the second and third locking members 250, 254 engage pins 270 extending through the second and third legs 18b, 18c. An elongate rod 274 extends between the second locking member 250 and the third locking member 254, causing the second and third locking members 250, 254 to unlock in unison. The first locking member 246 is positioned between opposing walls 278 of the support 34. Specifically, the walls 278 extend past the latch handle 258, thereby protecting the latch handle 258 from damage.

Figure 18:
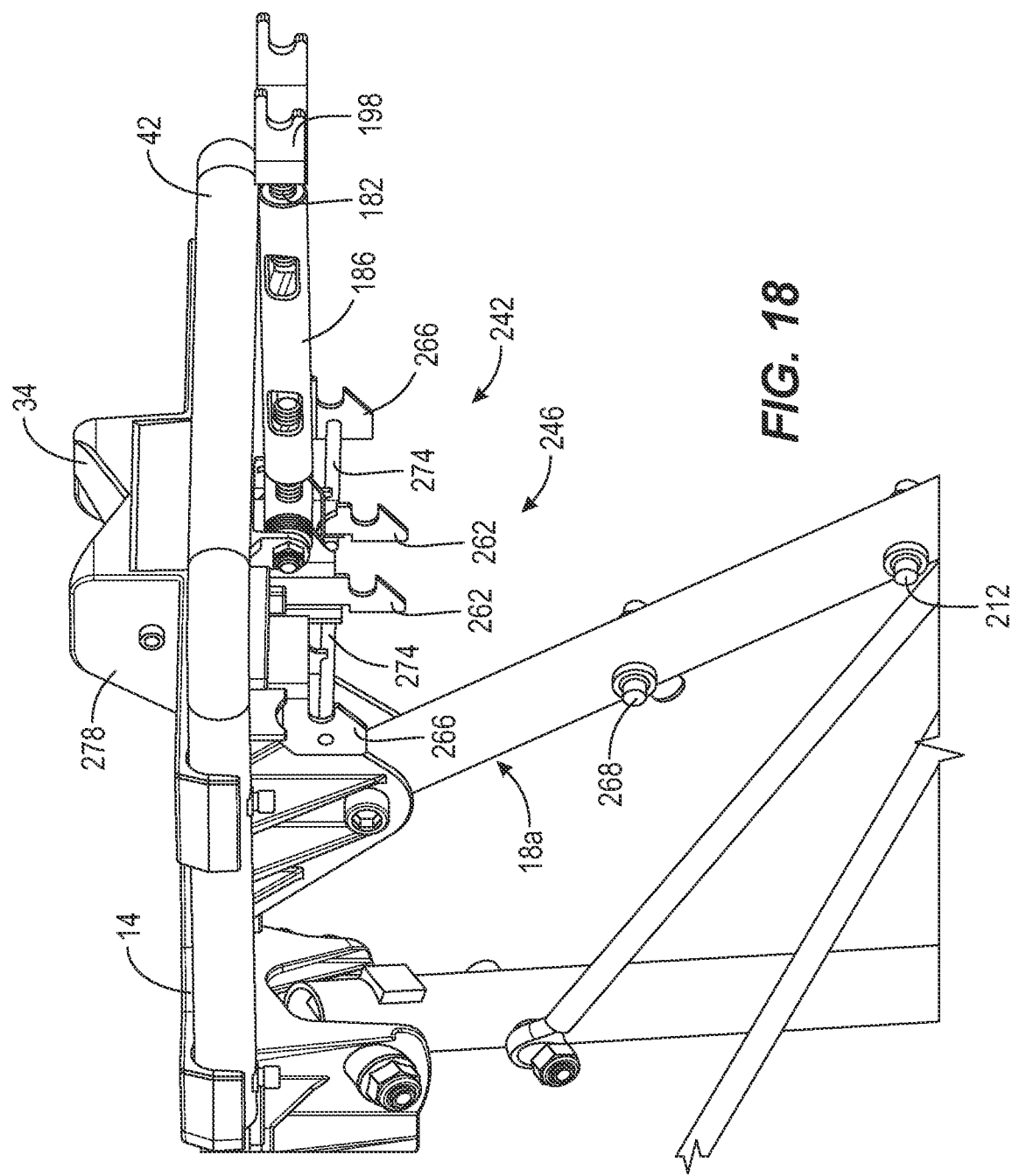
FIG. 18 is an enlarged perspective view of the pipe fitting stand of FIG. 1 in the deployed state, illustrating the locking mechanism in the unlocked position and the turnbuckle assembly in a second position.

The latch handle 258 may be manipulated by the user to alternately move the locking mechanism 242 between a first (i.e., locked) position and a second (i.e., released) position. The locking mechanism 242 includes a first biasing member (e.g., a torsion spring) 282 positioned adjacent to the latch handle 258 (e.g., along a biasing axis offset and parallel to a rotational axis of the locking mechanism 242), and a second biasing member (e.g., a torsion spring) 286 positioned along the biasing axis adjacent to the first torsion spring 282. The first and second torsion springs 282, 286 bias the first locking member 246 to the locked position, such that the first torsion spring 282 biases one of the hooks 266, and the second torsion spring 286 biases the other of the hooks 266. The locking mechanism 242 is pivotable about a pivot axis (not shown) coaxial with the biasing axis and parallel with the table 14. The locking mechanism 242 is pivotable in a first direction (e.g., counterclockwise from the frame of reference of FIGS. 17-19) toward the locked position, and in a second direction (e.g., clockwise from the frame of reference of FIGS. 17-19) toward the unlocked position.

With continued reference to FIG. 16, the first locking member 246 is engageable with the second pin 268 of the adjustable leg 18a, and the second and third locking members 250, 254 are engageable with the pins 270 extending through the legs 18b, 18c. In the unlocked position of the locking mechanism 242, the hooks 262 of the first locking member 246 are disengaged from the second pin 268 of the adjustable leg 18a, and the hooks 266 of the second and third locking members 250, 254 are disengaged with the pins 270 of the legs 18b, 18c, decoupling the first leg 18a and the first locking member 246, and the second and third legs 18b, 18c and the second and third locking members 250, 254. When the locking mechanism 242 is disengaged from the legs 18a-18c and the stand 10 is deployed (as will be described in more detail below), the turnbuckle 174 may pivot downward to engage the first pin 212 extending through the adjustable leg 18a.

Figure 20:
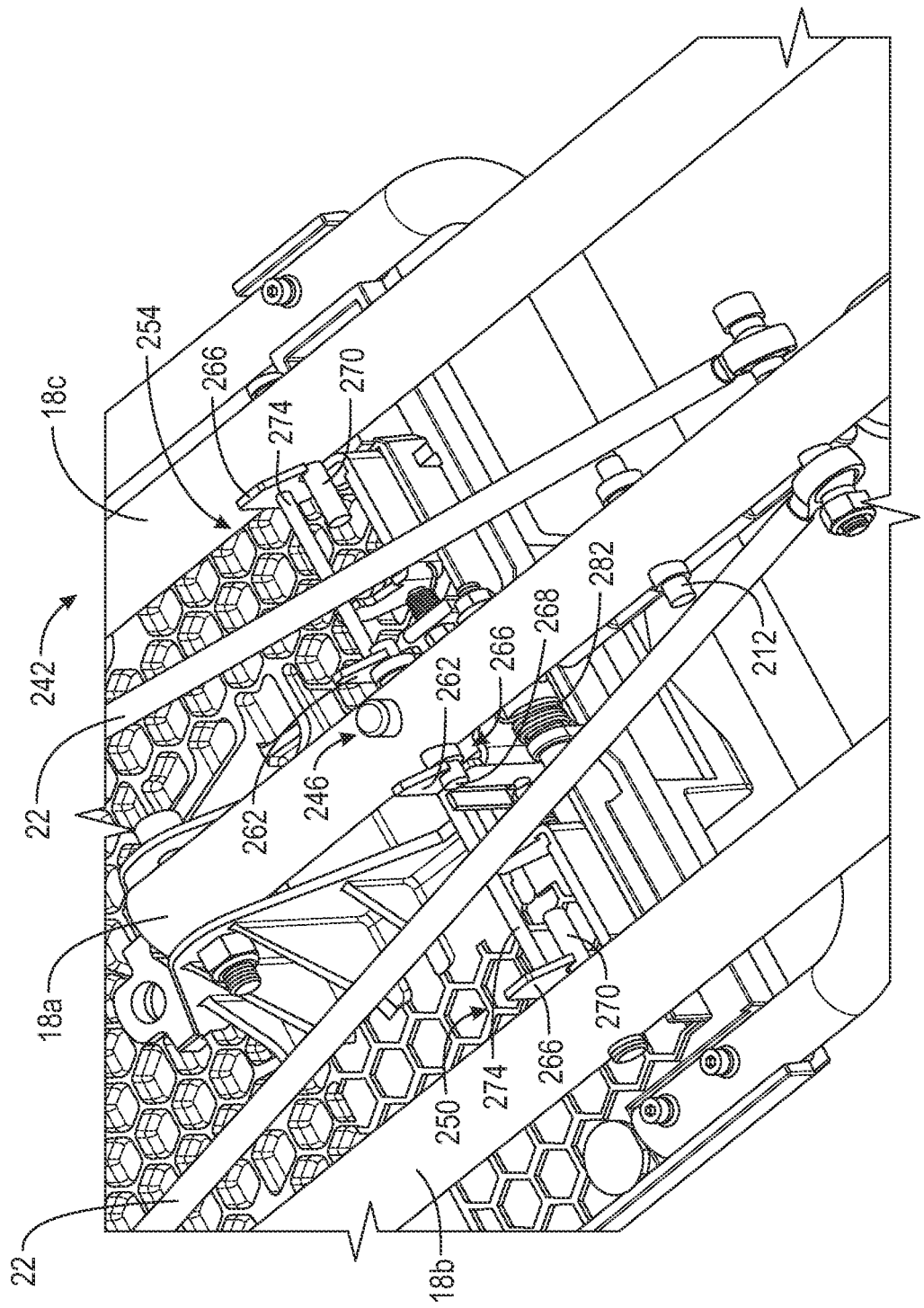
FIG. 20 is a bottom perspective view of the pipe fitting stand of FIG. 1 in the folded state, illustrating the locking mechanism in the locked position and the turnbuckle assembly in the second position.

To fold the stand 10 from the deployed state (FIGS. 1-2 and 17) to a folded state (FIGS. 3, 19, and 20), a user first rotates the spreader 186 to shorten the effective length of the turnbuckle assembly 174, which releases the preload between the table 14 and the legs 18a-18c. Once the turnbuckle assembly 174 is shortened to an effective length where the yoke 198 can clear the first pin 212, the turnbuckle assembly 174 can freely pivot toward the table 14, from the orientation shown in FIG. 17 to the orientation shown in FIG. 18. Then, while maintaining pressure on the mount 146 in order to keep the bottom surface 146b of the mount 146 in contact with the ground, the user grasps the operating handle 42 to lift the first side 14a of the table 14, subsequently causing the table 14 to pivot relative to the leg 18a.

At the same time, the remaining legs 18b, 18c are lifted from the ground and are pivoted relative to the table 14 by the links 22. During such movement, the user grasps the supplemental handle 38 with one hand while maintaining the grasp of the operating handle 42 with their other hand to pivot the table 14. Once the table 14 is generally perpendicular to the work surface, the biasing members 282, 286 bias the locking members 246, 250, 254 to pivot in the first direction. Pivotal movement of the locking members 246, 250, 254 translates to pivotal movement of the hooks 262, 266. The hooks 262 of the first locking member 246 automatically engage the second pin 268, placing the first locking member 246 in the locked position. The user then manually engages the hooks 266 of the second and third locking members 250, 254 into engagement with the pins 270 of the legs 18b, 18c, such that the second and third locking members 250, 254 are engaged with the pins 270 independently. While one of the second and third locking members (e.g., the second locking member 250) is being engaged with the pin 270 via the user, the biasing member 286 of the other of the second and third locking member (e.g., the third locking member 254) exerts a biasing force onto the first locking member 246, maintaining the first locking member 246 in the locked position. Once the second locking member 250 is secured to the pin 270, the biasing member 282 exerts a biasing force onto the first locking member 246, maintaining the first locking member 246 into the locked position. The user may then manually move the third locking member 254 into engagement with the pin 270, thereby placing the third locking member 254 in the locked position.

In the event that the hooks 262 of the first locking member 246 does not fully engage the second pin 268, the user may grasp the latch handle 258 and pivot the handle 258 in the second direction, thereby securing the hooks 262 to the second pin 268. When the stand 10 is in the fully folded state shown in FIG. 19, the legs 18b, 18c are positioned side by side with the leg 18a between the other two legs 18b, 18c. The turnbuckle assembly 174 is positioned between the operating handle 42 and the leg 18a and is oriented parallel with the table 14. The user can then easily store and transport the stand 10.

To adjust the stand 10 from the folded state to the deployed state, the user grasps the latch handle 258 of the locking mechanism 242 and pivots the latch handle 258 in the second direction. Movement of the latch handle 258 causes the hooks 266 of the second and third locking members 250, 254 to first disengage the pins 270 on the second and third legs 18b, 18c, and then, only after the hooks 266 disengage the pins 270, the hooks 262 of the first locking member 246 disengage the second pin 268 on the first leg 18a, placing the locking mechanism 242 in the unlocked position. The arrangement of the second and third locking members 250, 254 prevents binding of the stand 10 by preventing the adjustable leg 18a from deploying prior to the second and third legs 18b, 18c.

While maintaining the latch handle 258 in the unlocked position, the user engages the mount 146 with one of their feet, and then lifts that end of the table 14, subsequently causing the legs 18a-18c to pivot relative to the table 14 by the links 22. Once the hooks 262, 266 of the locking members clear the pins 268, 270 on the legs 18a-18c, the user may reposition their hands to a comfortable position (e.g., grasp the handle 42). The legs 18a-18c continue to pivot until the stops 118 on the second leg 18b and the third leg 18c engage the bracket 98. As mentioned above, the stops 118 prevent over-rotation past the deployed position. Once the legs 18a-18c are fully extended, the user then releases the latch handle 258, causing the torsion springs 282, 286 to bias the locking mechanism 242 to pivot in the first direction.

The turnbuckle assembly 174 is then used to maintain the legs 18a-18c in the deployed position. The turnbuckle assembly 174 can be pivoted from the orientation shown in FIG. 18 to the orientation shown in FIG. 17. The user holds the turnbuckle such that the yoke 198 engages the first pin 212 and then rotates the spreader 186 to lengthen then effective length of the turnbuckle assembly 174. Specifically, the spreader 186 is rotated until the turnbuckle assembly 174 is lengthened to an effective length where the yoke 198 engages the first pin 212. Once the yoke 198 engages the first pin 212, further rotation of the spreader 186 preloads the leg 18a, and also the stops 118 on the legs 18a, 18c against the underside 26 of the table 14, thereby maintaining the legs 18a-18c in the deployed position and precluding or eliminating any looseness between the table 14 and the legs 18a-18c that have developed over the life of the stand 10.

Figure 21:
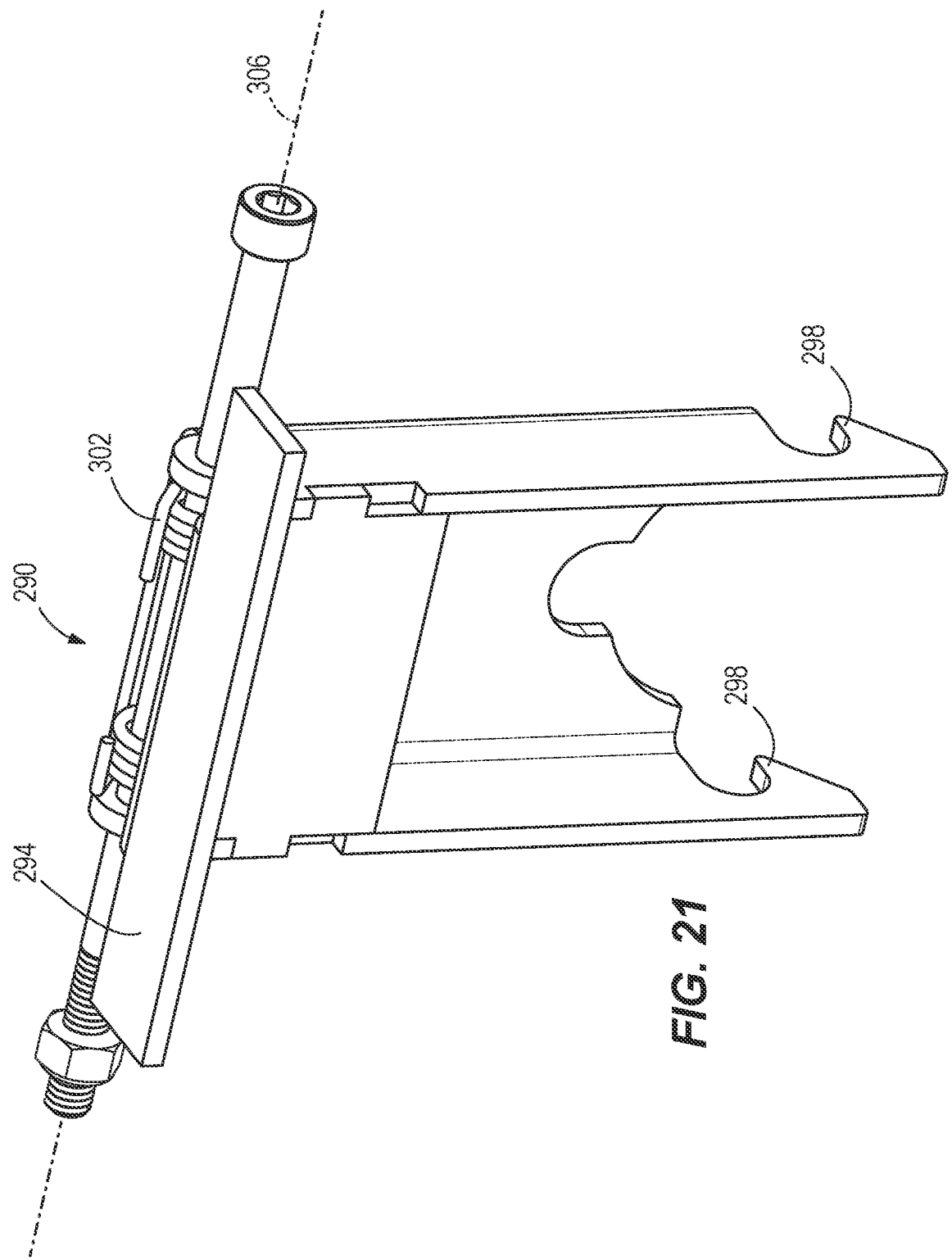
FIG. 21 is an enlarged perspective view of an alternative locking mechanism for the pipe fitting stand of FIG. 1.

FIG. 21 illustrates an alternative locking mechanism 290 that could be used with the pipe stand 10. The locking mechanism 290 extends between the table 14 and the leg 18a for selectively locking the legs 18a-18c into the deployed position, or the folded position. Because the other legs 18b, 18c are connected to the adjustable leg 18a via the links 22, the legs 18b, 18c are also locked into a deployed position when the leg 18a is locked into the deployed position by the locking mechanism 290. The locking mechanism 290 is a single, unitary piece including a latch handle 294 and a pair of hooks 298. The locking mechanism 290 is positioned between opposing walls 278 of the support 34. Specifically, the walls 278 extend past the latch handle 294, thereby protecting the latch handle 294 from damage. The latch handle 294 may be manipulated by the user to alternately move the locking mechanism 290 between a first (i.e., locked) position and a second (i.e., released) position. The locking mechanism 290 additionally includes a biasing member (e.g., a torsion spring 302) positioned adjacent to the latch handle 294 (e.g., along a rotational axis of the locking mechanism 290), such that the torsion spring 302 biases the locking mechanism 290 to the locked position. Specifically, the locking mechanism 290 is pivotable about a pivot axis 306 coaxial with the torsion spring 302 and parallel with the table 14. The locking mechanism 290 is pivotable in a first direction A1 (e.g., counterclockwise from the frame of reference of FIGS. 22-24) toward the locked position, and in a second direction A2 (e.g., clockwise from the frame of reference of FIGS. 22-24) toward the unlocked position.

Figure 22:
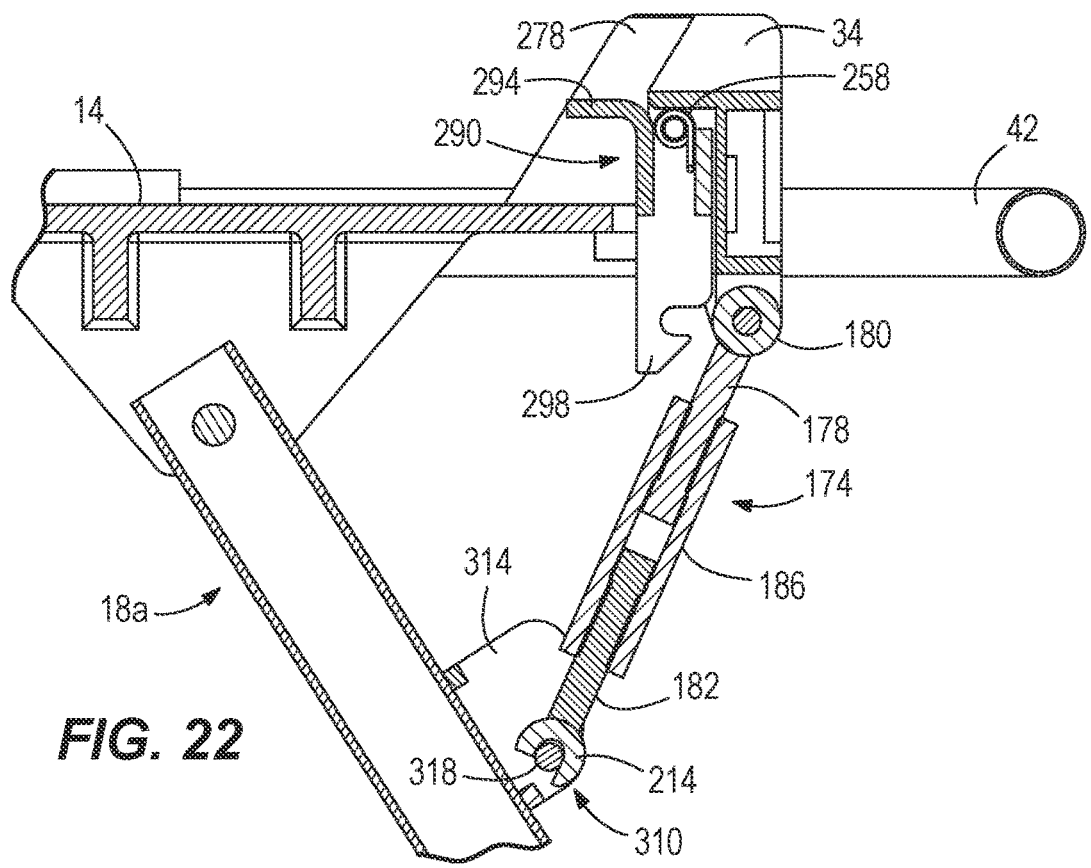
FIG. 22 is an enlarged perspective view of the pipe fitting stand of FIG. 1 in a deployed state, illustrating the locking mechanism of FIG. 21 in an unlocked position and the turnbuckle assembly in a first position.
Figure 23:
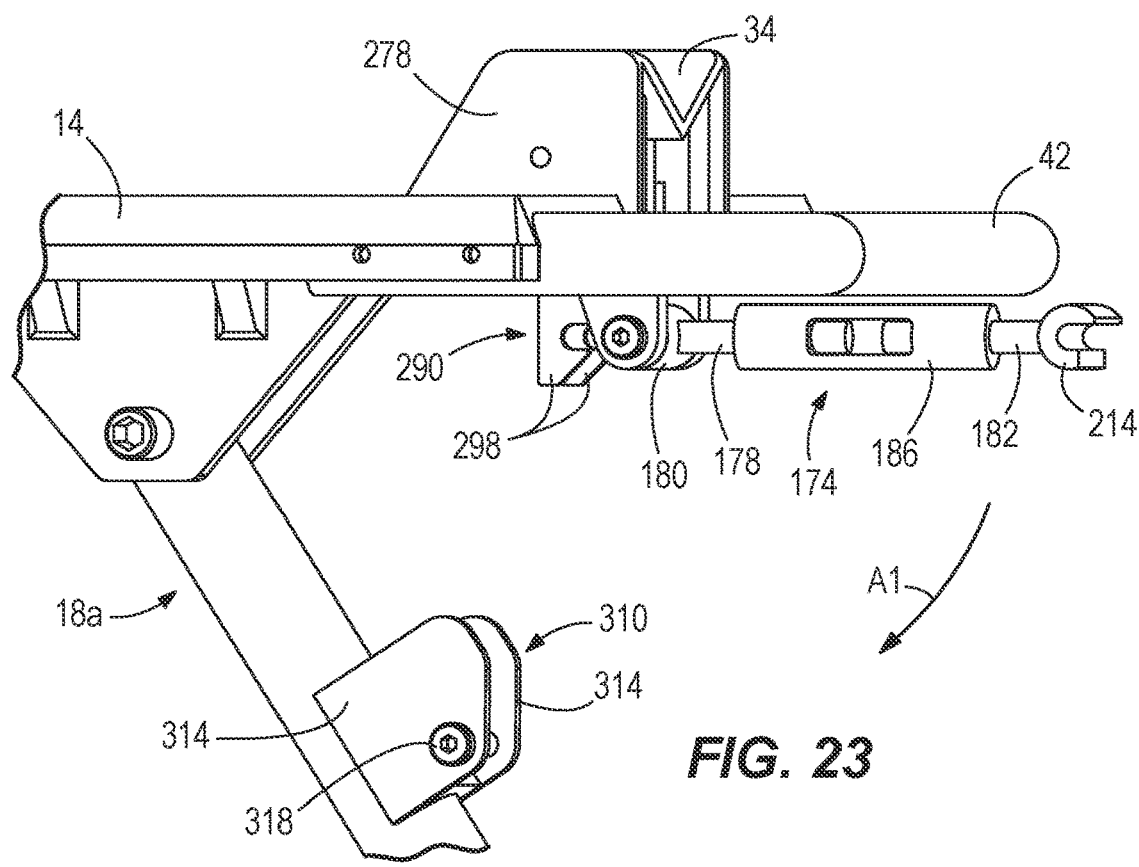
FIG. 23 is an enlarged perspective view of the pipe fitting stand of FIG. 1 in the deployed state, illustrating the locking mechanism of FIG. 21 in the unlocked position and the turnbuckle assembly in a second position.

With reference to FIGS. 22-24, the locking mechanism 290 is engageable with a bracket assembly 310 positioned on the adjustable leg 18a. The bracket assembly 310 includes two parallel plates 314 and an aperture 318 extending therethrough. The aperture 318 is configured to receive a pin (not shown), thereby allowing the hooks 298 of the locking mechanism 290 to engage the pin when in the locked position. Alternatively, in the unlocked position of the locking mechanism 290, the hooks 298 are disengaged from the pin, decoupling the first leg 18a and the locking mechanism 290. When the locking mechanism 290 is disengaged from the pin and the stand 10 is deployed, the turnbuckle 174 may pivot downward as shown in the direction of arrow A1.

To fold the stand 10 from the deployed state (FIGS. 1-2 and 22) to the folded state (FIGS. 3 and 24), a user first releases the turnbuckle assembly 174, as described above. Then, while maintaining pressure on the mount 146 in order to keep the bottom surface 146b of the mount 146 in contact with the ground, the user grasps the operating handle 42 to lift the first side 14a of the table 14, subsequently causing the table 14 to pivot relative to the leg 18a. At the same time, the remaining legs 18b, 18c are lifted from the ground and are pivoted relative to the table 14 by the links 22. During such movement, the user grasps the latch handle 294 of the locking mechanism 290 and pivots the latch handle 294 in the second direction (shown by arrows A2 in FIG. 24), thereby placing the locking mechanism 290 in the second or unlocked position. When the stand 10 is in the fully folded state shown in FIG. 24, the legs 18b, 18c are positioned side by side with the leg 18a between the other two legs 18b, 18c. The turnbuckle assembly 174 is positioned between the operating handle 42 and the leg 18a and is oriented parallel with the table 14. The user then releases the latch handle 294 of the locking mechanism 290. The biasing member 302 subsequently biases the latch handle 294 to pivot in the first direction, opposite arrow A2. Pivotal movement of the latch handle 294 translates to pivotal movement of the hooks 298. Therefore, the hooks 298 simultaneously pivot in the first direction and into engagement with the (not shown), thereby securing the legs 18a-18c against the table 14 in the folded state. The user can then easily store and transport the stand 10.

To adjust the stand 10 from the folded state to the deployed state, the user grasps the latch handle 294 of the locking mechanism 290 and pivots the latch handle 294 in the second direction A2, against the bias of the torsion spring 302. Movement of the latch handle 294 causes the hooks 298 to disengage the pin (not shown) and place the locking mechanism 290 in the unlocked position.

While maintaining the latch handle 294 in the unlocked position, the user engages the mount 146 with one of their feet, and then lifts that end of the table 14, subsequently causing the legs 18a-18c to pivot relative to the table 14 by the links 22. The legs 18a-18c continue to pivot until the stops 118 on the second leg 18b and the third leg 18c engage the bracket 98. As mentioned above, the stops 118 prevent over-rotation past the deployed position. Once the legs 18a-18c are fully extended, the user then releases the latch handle 294, causing the torsion spring 302 to bias the locking mechanism 290 to pivot in the first direction (counter-clockwise, in the opposite direction of arrow A2).

The turnbuckle assembly 174 is then used to maintain the legs 18a-18c in the deployed position. The turnbuckle assembly 174 can be pivoted from the orientation shown in FIG. 23 to the orientation shown in FIG. 22. The user holds the turnbuckle 174 such that the partial-cylindrical bushing 214 engages the pin (not shown) and then rotates the spreader 186 to lengthen then effective length of the turnbuckle assembly 174. Specifically, the spreader 186 is rotated until the turnbuckle assembly 174 is lengthened to an effective length where the partial-cylindrical bushing 214 engages the pin (not shown) of the bracket assembly 310. Once the bushing 214, engages the pin (not shown), further rotation of the spreader 186 preloads the leg 18a, and also the stops 118 on the legs 18a, 18c against the underside of the table 14, thereby maintaining the legs 18a-18c in the deployed position.

In some embodiments (FIG. 25), the latch handle 294 of the locking mechanism 290 may be replaced by a linearly translatable actuator 322. In such instances, the actuator 322 may be depressed by the user to move the locking mechanism 290 between the first (e.g., locked) position and the second (e.g., released) position. The locking mechanism 290 additionally includes a biasing member (e.g., a spring, not shown) positioned adjacent the actuator 322, such that the spring biases the locking mechanism 290 to the locked position. In this embodiment, the hooks 298 are oriented in an upward direction, such that the hooks 298 are engagable with the pin of the bracket assembly 310 in the locked position, and disengage the pin in the unlocked position.

Figure 26:
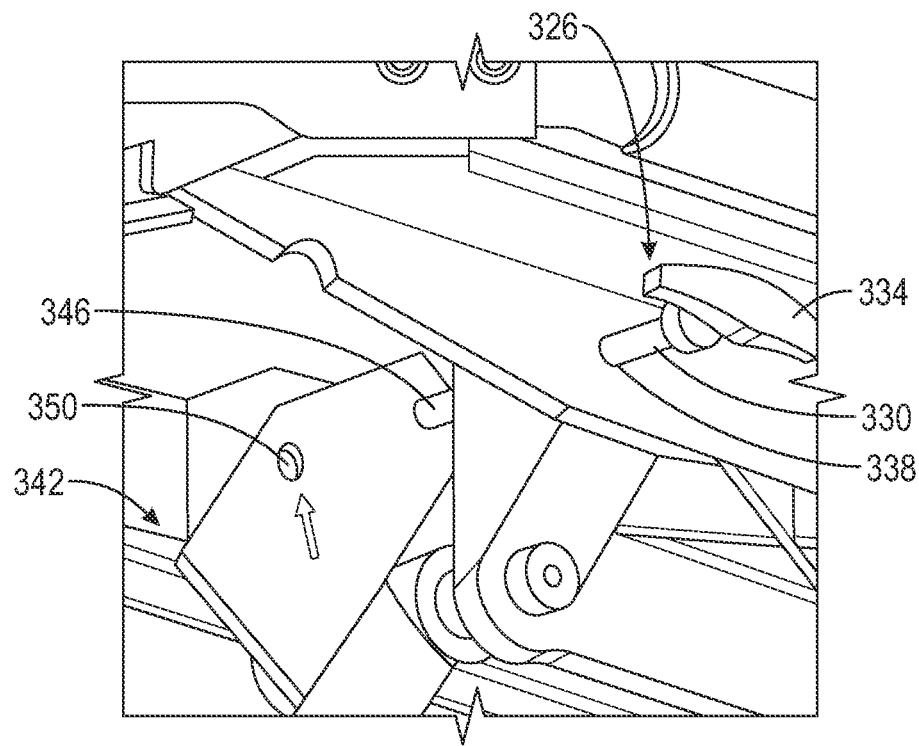
FIG. 26 is an enlarged perspective view of another alternative locking mechanism for the pipe fitting stand of FIG. 1.

FIG. 26 illustrates an alternative locking mechanism 326 that could be used with the pipe stand 10. The locking mechanism 326 includes spring-biased pin 330 and a handle 334. The pin 330 extends through a corresponding aperture 338 on a side of the table 14 and is engageable with a bracket assembly 342 fixed to the adjustable leg 18a. Specifically, the bracket assembly 342 includes a first aperture 346 for securing the stand 10 in the deployed state, and a second aperture 350 for securing the stand 10 in the folded state. The pin 330 is biased via the spring into the first aperture 346 or the second aperture 350 depending upon the state of the stand 10.

Figure 27:
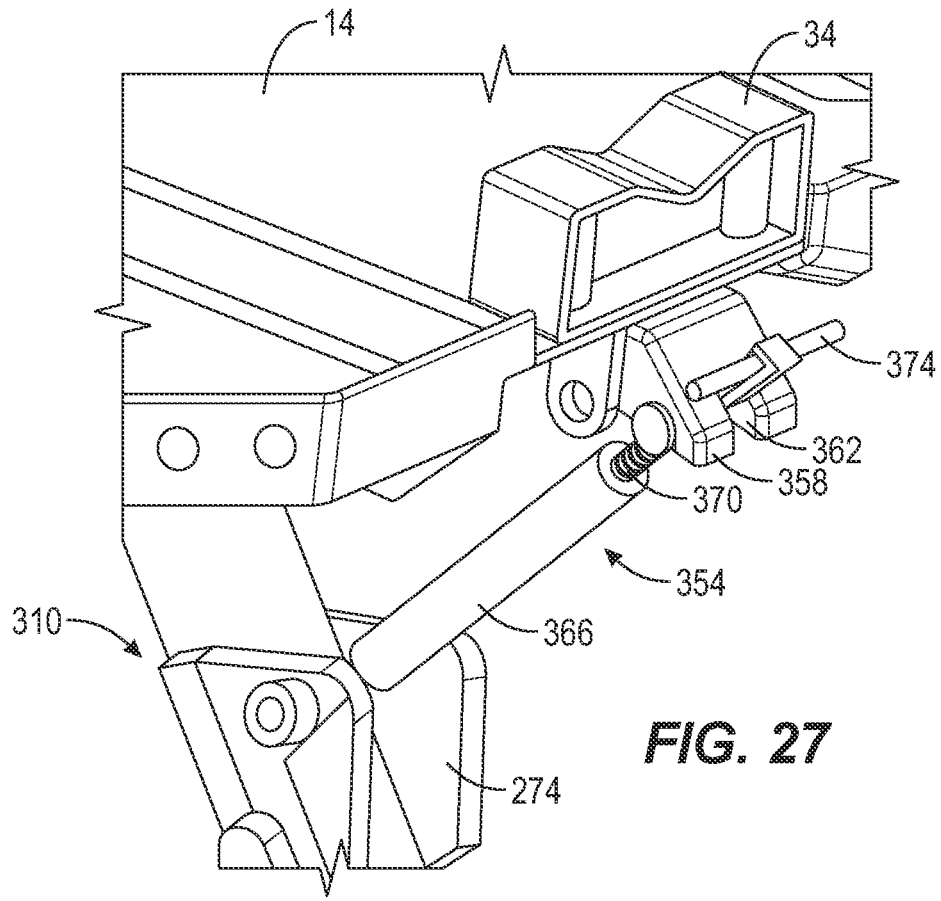
FIG. 27 is an enlarged perspective view of an extensible link that could alternatively be used instead of the turnbuckle assembly of FIG. 11.

In some embodiments of the pipe stand 10 (FIG. 27), the turnbuckle assembly 174 may be replaced by an extensible link 354 to remove looseness between the table 14 and the legs 18a-18c. A mount 358 having a slot 362 therein is attached to the table 14. And, the extensible link 354 includes a fixed-length portion 366 having a first end pivotably coupled to the bracket assembly 310 and an opposite, second end threaded to an adjustable-length portion 370. A knob 374 is coupled for co-rotation with the adjustable-length portion 370 of the extensible link 354 and is at least partially received within the slot 362. During operation, a user rotates the knob 374 in a first direction, which unthreads the adjustable-length portion 370 from the fixed-length portion 366, increasing the effective length of the extensible link 354 to preload the leg 18a against the table 14. Alternatively, when the knob 374 is rotated in an opposite, second direction, the adjustable-length portion 370 threads into the fixed-length portion 366, shortening the effective length of the extensible link 354, removing the force exerted on the table 14. Unlike the location of the spreader 186, the knob 374 is located more closely to the user and thus is more easily accessible for grasping for adjustment.

Although the invention has been described in detail with reference to certain preferred embodiments, variations and modifications exist within the scope and the spirit of one or more independent aspects of the invention as described.

What is claimed is:

1. A pipe fitting stand for supporting a pipe during a work operation, the pipe fitting stand comprising:
   a table;
   a plurality of legs coupled to the table and movable between a deployed position and a stowed position; and
   a locking mechanism movable between a first position in which the locking mechanism engages at least one of the plurality of legs, and a second position in which the locking mechanism disengages the at least one of the plurality of legs;
   wherein, in the first position, the locking mechanism is configured to secure the table in the stowed position; and
   wherein at least one of the plurality of legs is parallel to the table when in the stowed position; wherein the locking mechanism includes a first member engagable with a first leg of the plurality of legs, and a second member engagable with a second leg of the plurality of legs; wherein the locking mechanism includes a third member engagable with a third leg of the plurality of legs, wherein the second member and the third member are configured to disengage the second leg and the third leg in unison.

2. The pipe fitting stand of claim 1, wherein the locking member includes a first biasing member configured to bias the first member to the first position.

3. The pipe fitting stand of claim 1, further comprising a turnbuckle assembly movable between a first position in which the turnbuckle assembly engages one of the plurality of legs in the deployed position, and a second position in which the turnbuckle assembly disengages the one of the plurality of legs.

4. The pipe fitting stand of claim 3, wherein the turnbuckle assembly is adjustable to exert a force against the one of the plurality of legs to maintain the legs in the deployed position and preclude any looseness between the table and the legs.

5. A pipe fitting stand for supporting a pipe during a work operation, the pipe fitting stand comprising:
a table;
a plurality of legs coupled to the table and movable between a deployed position and a stowed position; and
a turnbuckle assembly movable between a first position in which the turnbuckle assembly engages one of the plurality of legs, and a second position in which the turnbuckle assembly disengages the one of the plurality of legs;
wherein when in the first position, the turnbuckle assembly is coupled to the table and the one of the plurality of legs and adjustable to exert a force against the one of the plurality of legs to maintain the legs in the deployed position and preclude any looseness between the table and the legs.

6. The pipe fitting stand of claim 5, wherein the turnbuckle assembly includes a first rod, a second rod, and a spreader threadably coupled to the first rod and the second rod.

7. The pipe fitting stand of claim 6, wherein rotation of the spreader in a first direction increases a length of the turnbuckle assembly, thereby increasing the force exerted against the one of the plurality of legs, and rotation of the spreader in a second direction decreases the length of the turnbuckle assembly, thereby decreasing the force exerted against the one of the plurality of legs.

8. The pipe fitting stand of claim 6, wherein the turnbuckle assembly includes a bushing configured to pivotably couple the first rod to an underside of the table.

9. The pipe fitting stand of claim 6, wherein the turnbuckle assembly includes a yoke coupled to the second rod, wherein the yoke is configured to selectively engage the one of the plurality of legs.

10. The pipe fitting stand of claim 9, wherein the yoke includes a groove configured to engage a pin extending through the one of the plurality of legs.

11. The pipe fitting stand of claim 6, wherein each one of the first rod and the second rod is prevented from fully unthreading from the spreader.

12. The pipe fitting stand of claim 11, wherein each one of the first rod and the second rod has a distal end that is staked to prevent fully unthreading from the spreader.

13. A pipe fitting stand for supporting a pipe during a work operation, the pipe fitting stand comprising:
a table;
a plurality of legs coupled to the table and movable between a deployed position and a stowed position; and
a locking mechanism movable between a first position in which the locking mechanism engages the plurality of legs, and a second position in which the locking mechanism disengages the plurality of legs, wherein the locking mechanism includes
a first member engagable with a first leg of the plurality of legs, and
a second member engagable with a second leg of the plurality of legs, and
wherein the second member is configured to disengage the second leg before the first member disengages the first leg in response to the locking mechanism transitioning from the first position to the second position.

14. The pipe fitting stand of claim 13, wherein the locking mechanism includes a third member engagable with a third leg of the plurality of legs, wherein the third member is configured to disengage the third leg before the first member disengages the first leg in response to the locking mechanism transitioning from the first position to the second position.

15. The pipe fitting stand of claim 14, wherein the locking mechanism includes a rod coupled to the second member and the third member, wherein the rod causes the second member and the third member to disengage the second leg and the third leg in unison.

16. The pipe fitting stand of claim 13, wherein the first member includes a first hook and the second member includes a second hook, wherein when the locking mechanism is in the first position, the first hook engages a pin positioned on the first leg and the second hook engages a pin positioned on the second leg.

17. The pipe fitting stand of claim 16, wherein when the locking mechanism moves to the second position, the first hook disengages the pin positioned on the first leg and the second hook disengages the pin positioned on the second leg.

18. The pipe fitting stand of claim 13, further comprising a turnbuckle assembly movable between an engaged position in which the turnbuckle assembly engages the first leg in the deployed state, and a disengaged position in which the turnbuckle assembly disengages the first leg.

19. The pipe fitting stand of claim 18, wherein the turnbuckle assembly is adjustable to exert a force against the first leg to maintain the plurality of legs in the deployed position and preclude any looseness between the table and the plurality of legs.

20. A pipe fitting stand for supporting a pipe during a work operation, the pipe fitting stand comprising:
a table;
a plurality of legs coupled to the table and movable between a deployed position and a stowed position;
a locking mechanism movable between a first position in which the locking mechanism engages the plurality of legs, and a second position in which the locking mechanism disengages the plurality of legs; and
a turnbuckle assembly extending between and engagable with the table and one of the plurality of legs in the deployed position,
wherein when in the second position, the locking mechanism is configured to secure the legs in the stowed position, and
wherein the turnbuckle assembly is adjustable to exert a force against the one of the plurality of legs to maintain the legs in the deployed position and preclude any looseness between the table and the legs.

* * * * *